United States Patent
Klappert et al.

(10) Patent No.: US 9,922,448 B2
(45) Date of Patent: Mar. 20, 2018

(54) SYSTEMS AND METHODS FOR GENERATING A THREE-DIMENSIONAL MEDIA GUIDANCE APPLICATION

(71) Applicant: Rovi Guides, Inc., Santa Clara, CA (US)

(72) Inventors: Walter Richard Klappert, Los Angeles, CA (US); Thomas Steven Woods, Arlington Heights, IL (US); Henry C. Chilvers, Valencia, CA (US)

(73) Assignee: ROVI Guides, Inc., San Jose, CA (US)

( * ) Notice: Subject to any disclaimer, the term of this patent is extended or adjusted under 35 U.S.C. 154(b) by 0 days.

(21) Appl. No.: 14/601,009

(22) Filed: Jan. 20, 2015

(65) Prior Publication Data

US 2015/0187122 A1 Jul. 2, 2015

Related U.S. Application Data

(63) Continuation of application No. 12/571,287, filed on Sep. 30, 2009, now Pat. No. 8,970,669.

(51) Int. Cl.
*H04N 13/00* (2006.01)
*G06T 15/20* (2011.01)
(Continued)

(52) U.S. Cl.
CPC ............ *G06T 15/205* (2013.01); *G06F 3/011* (2013.01); *G06F 3/017* (2013.01); *G06F 3/0346* (2013.01);
(Continued)

(58) Field of Classification Search
CPC ..... G06T 15/20; G06F 3/013; G06F 3/04815; H04N 13/0278; H04N 13/0438; H04N 13/0456; H04N 13/0484
See application file for complete search history.

(56) References Cited

U.S. PATENT DOCUMENTS

| | | | |
|---|---|---|---|
| 6,532,590 B1 * | 3/2003 | Chimoto | H04N 5/44543 348/E5.105 |
| 6,836,274 B1 * | 12/2004 | Kikinis | G06F 3/04815 345/679 |

(Continued)

FOREIGN PATENT DOCUMENTS

| JP | 2005-065162 | 3/2005 |
|---|---|---|
| JP | 2005065162 | 3/2005 |

(Continued)

*Primary Examiner* — Yves Dalencourt
*Assistant Examiner* — Blake Rubin
(74) *Attorney, Agent, or Firm* — Haley Guiliano LLP

(57) ABSTRACT

Systems and methods for navigating a three-dimensional (3D) media guidance application are provided. A first selectable media guidance object may be displayed on a screen that when viewed through the stereoscopic optical device may appear in a first plane. A second selectable media guidance object may be displayed on the screen that when viewed through the stereoscopic optical device may appear in a second plane. The first and second planes may be perceived to intersect an axis normal to the display in different locations. A user selection of at least one of the first and second selectable media guidance objects may be received. An action of moving a cursor in 3D space or selecting one of the selectable media guidance objects displayed in the 3D space may be performed based on the user selection. The user selection may be performed with an input device having as accelerometer.

20 Claims, 14 Drawing Sheets

(51) Int. Cl.

| | | |
|---|---|---|
| *G06F 3/0346* | (2013.01) | |
| *G06F 3/0481* | (2013.01) | |
| *H04N 21/422* | (2011.01) | |
| *H04N 21/482* | (2011.01) | |
| *H04N 5/445* | (2011.01) | |
| *H04N 21/4223* | (2011.01) | |
| *H04N 21/431* | (2011.01) | |
| *G06F 3/01* | (2006.01) | |
| *G06F 3/0484* | (2013.01) | |
| *H04N 5/262* | (2006.01) | |
| *H04N 13/04* | (2006.01) | |
| *H04N 21/81* | (2011.01) | |
| *H04N 13/02* | (2006.01) | |

(52) U.S. Cl.
CPC ...... *G06F 3/04815* (2013.01); *G06F 3/04842* (2013.01); *H04N 5/2628* (2013.01); *H04N 5/44543* (2013.01); *H04N 13/004* (2013.01); *H04N 13/007* (2013.01); *H04N 13/0278* (2013.01); *H04N 13/0438* (2013.01); *H04N 13/0456* (2013.01); *H04N 13/0468* (2013.01); *H04N 21/422* (2013.01); *H04N 21/4223* (2013.01); *H04N 21/4312* (2013.01); *H04N 21/482* (2013.01); *H04N 21/8146* (2013.01); *G06T 2200/04* (2013.01); *G06T 2219/2004* (2013.01); *H04N 13/0014* (2013.01); *H04N 13/026* (2013.01); *H04N 21/4821* (2013.01); *H04N 21/812* (2013.01)

(56) References Cited

U.S. PATENT DOCUMENTS

| | | | |
|---|---|---|---|
| 7,091,998 B2 | 8/2006 | Miller-Smith | |
| 7,233,316 B2 | 6/2007 | Smith | |
| 8,970,669 B2 | 3/2015 | Klappert et al. | |
| 2002/0126121 A1* | 9/2002 | Robbins | G06T 11/206 345/440 |
| 2002/0171686 A1* | 11/2002 | Kamen | G06F 3/04815 715/850 |
| 2003/0084445 A1* | 5/2003 | Pilat | H04N 5/44543 725/44 |
| 2003/0169303 A1* | 9/2003 | Islam | G06F 3/04817 715/836 |
| 2004/0103432 A1* | 5/2004 | Barrett | G06F 3/04815 725/39 |
| 2004/0160386 A1* | 8/2004 | Michelitsch | G09G 5/00 345/10 |
| 2004/0233239 A1 | 11/2004 | Landesmaki | |
| 2007/0107015 A1* | 5/2007 | Kazama | G06F 3/04815 725/58 |
| 2008/0163328 A1 | 7/2008 | Philbin et al. | |
| 2008/0285769 A1 | 11/2008 | Shao | |
| 2010/0083316 A1* | 4/2010 | Togashi | H04N 5/44543 725/41 |
| 2010/0208040 A1* | 8/2010 | Guillou | H04N 13/007 348/51 |
| 2010/0302237 A1* | 12/2010 | Aramaki | H04N 13/0497 345/419 |
| 2011/0018966 A1* | 1/2011 | Kitazato | H04N 13/004 348/43 |
| 2011/0018976 A1* | 1/2011 | Park | H04N 13/0018 348/51 |
| 2011/0032330 A1* | 2/2011 | Kim | H04N 13/0029 348/43 |
| 2011/0078737 A1* | 3/2011 | Kanemaru | H04N 13/0059 725/40 |
| 2011/0099488 A1 | 4/2011 | Jin et al. | |
| 2011/0102554 A1* | 5/2011 | Saito | G09G 3/003 348/51 |
| 2011/0119709 A1* | 5/2011 | Kim | H04N 13/004 725/39 |
| 2012/0099836 A1* | 4/2012 | Welsh | H04N 13/004 386/230 |

FOREIGN PATENT DOCUMENTS

| | | |
|---|---|---|
| WO | WO 01/61456 | 2/2001 |
| WO | WO2006108617 | 10/2006 |
| WO | WO 2011/005544 | 1/2011 |

\* cited by examiner

SYSTEMS AND METHODS FOR GENERATING A THREE-DIMENSIONAL MEDIA GUIDANCE APPLICATION

CROSS REFERENCE TO RELATED APPLICATION

This application is a continuation of U.S. patent application Ser. No. 12/571,287, filed Sep. 30, 2009, currently pending, which is hereby incorporated by reference herein in its entirety.

BACKGROUND OF THE INVENTION

Due to one overwhelming volume of media content (e.g., video and audio) available to the average person (e.g., via the Internet, cable and satellite television and radio), interactive media guidance applications, such as interactive program guides, have gained widespread popularity. Typically, interactive media guidance applications present guide listings in a two-dimensional (2D) grid indexed by time and program source (e.g., a television channel). In particular, the guide listings appear flat on the screen. These guidance applications also present other guide related data (e.g., user profiles, recommendations) in a 2D view.

SUMMARY OF THE INVENTION

In view of the foregoing, systems and methods for navigating a three-dimensional (3D) media guidance application in accordance with various embodiments of the present invention are provided. In particular, selectable media guidance objects displayed on a 2D screen may appear to be positioned anywhere in a 3D space when the 2D screen is viewed using a stereoscopic optical device.

In some embodiments, a media guidance application that is viewed through a stereoscopic optical device may be presented on a screen. The media guidance application may include selectable media guidance objects that appear to be at different distances from the user in 3D space. In some implementations, first and second of the selectable media guidance objects that when viewed through the stereoscopic optical device appear in first and second planes, respectively may be displayed. The second plane may be perceived to intersect an axis normal to the display screen in a different location than the first plane. This may create the appearance that the first selectable media guidance object is closer to the user than the second selectable media guidance object.

In some embodiments, the stereoscopic optical device may include left and right lenses corresponding to a user's left and right eyes. The stereoscopic optical device may be configured to receive a signal from the media equipment device indicating which of the lenses to block and which of the lenses to unblock. A lens that is blocked may not allow visible light to pass while an unblocked lens may allow visible light to pass. In some implementations, the stereoscopic optical device may be instructed to block the left lens and unblock the right lens when only a portion of the stereoscopic image that is generated for the right eye is displayed on the screen and the stereoscopic optical device may be instructed to block the right lens and unblock the left lens when only a portion of the stereoscopic image that is generated for the left eye is displayed on the screen. In some implementations, each or the portions of the stereoscopic image that are generated for a corresponding eye may be displayed on the screen and the corresponding lenses may be blocked and unblocked, in an alternative manner at a last enough rate that the user stay not be capable of perceiving the two images separately and perceives the images together to interpret the combined images as being three-dimensional.

In some embodiments, a user selection of at least one of the displayed selectable media guidance objects may be received. In some implementations, the user selection may be received with an input device having an accelerometer. In other implementations, the input device may have a gyroscope instead of or in addition to an accelerometer. The media equipment device may detect movement of the input device. Based on the detected movement of the input device, the media equipment device may perform an action relative to the displayed selectable media guidance objects. In some implementations, the media equipment device may move a cursor in 3D space based on the movement of the input device. In particular, the user may swing the input device in a clockwise manner towards the right and as a result, the media equipment device may move the cursor within the 3D space in a circular manner in the clockwise direction. In some implementation, the media equipment device may detect a quick (jerk-like) motion of the input device and as a result, the media equipment device may effect selection of a selectable media guidance object, that is nearest to the position of the cursor in the 3D space.

In some embodiments, the media equipment device may detect a motion of the input device in a particular direction and as a result, the media equipment device may change a mode of the displayed selectable media guidance objects. In particular, the mode of the selectable media guidance objects may correspond to actors associated with a particular media asset. As a result of detecting motion of the input device, the media equipment device may change the mode of the selectable media guidance objects to correspond to a playlist mode. More specifically, when the selectable media guidance objects are in playlist mode, one of the selectable media guidance objects may identify a particular playlist and the remaining selectable media guidance objects may represent media assets of the playlist.

In some embodiments, the stereoscopic media guidance application may be generated locally by the media equipment device. The media equipment device may generate a first image that includes a selectable media guidance object centered at a first point of the screen to be viewed with a user's right eye. The media equipment device may generate a second image that includes a copy of the selectable media guidance object centered at a second point of the screen different from the first point to be viewed with the user's left eye. In some implementations, the media equipment device may superimpose the first and second images for display on the screen to produce a stereoscopic image. The selectable media object may appear in the stereoscopic image at a perceived, distance from the user when the user views the stereoscopic image through the stereoscopic optical device. The distance between the first and second points on the screen may be proportional to the perceived distance.

In some embodiments, the media equipment device may alternate the display of the first and second images and may instruct the stereoscopic optical device to block/unblock lenses corresponding to the image that is displayed. In some implementations, the media equipment device may alternate the display of the first and second images at a rate faster than can be perceived by the user.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF EMBODIMENTS

Figure 1:
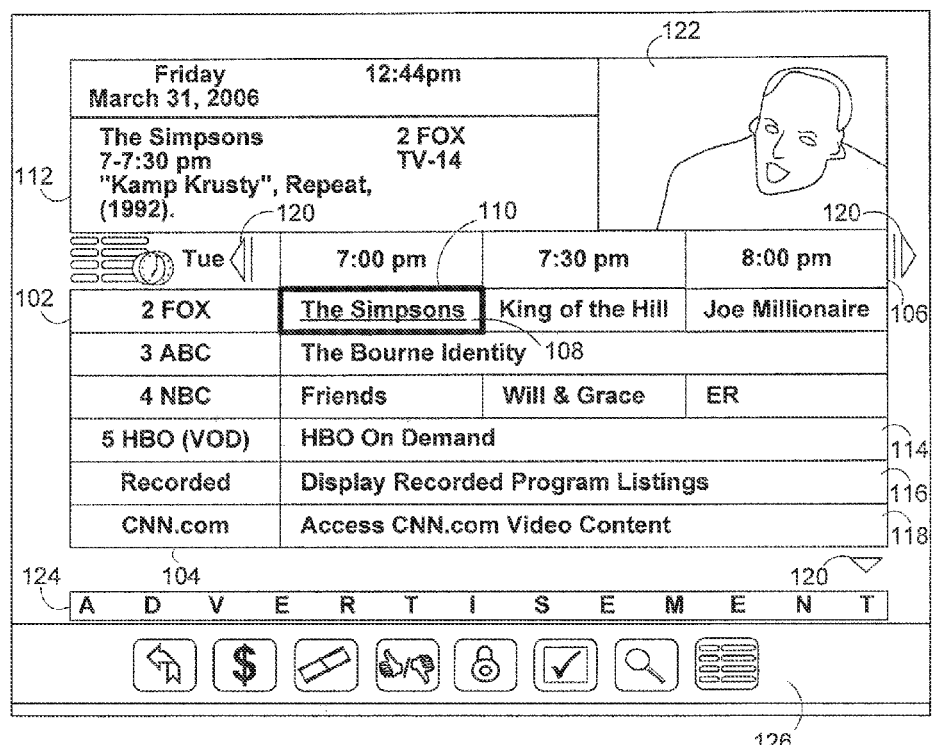
FIGS. 1 and 2 show illustrative display screens that may be used to provide media guidance application listings in accordance, with an embodiment of the invention.

This invention generally relates to presenting and designing a stereoscopic, or 3D, media guidance application. In particular, an object of a plurality which is in focus (e.g., a user profile, media asset, or program schedule information) is displayed in a first plane, and the remaining objects in the plurality are displayed in additional planes that are perceived to intersect an axis normal to the display screen in a different location than the first plane. More specifically, the object in focus may be displayed to appear flat on the screen and other objects may be displayed to appear as though they are in front of or behind the screen. As defined herein, an asset or media asset refers to any type or media (or data file) that may be played, accessed, recorded and/or viewed. As referred to herein, the term "focus" or being into focus should be understood to mean to change the appearance of a displayed item or object to make the item or object more visually prominent than other items or objects.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information consent processing devices, such as computerised and electronic devices, but can also be part of a live performance. It should be understood that the invention embodiments that are discussed in relation to media content are also applicable to other types of content, such as video, audio and/or multimedia.

With the advent of the Internet, mobile competing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as online applications (i.e., provided on a website), or as stand-alone applications or clients on hand-held computers, PDAs, mobile telephones, or other mobile devices. The various devices and platforms that may implement media guidance applications are described in more detail below.

Figure 2:
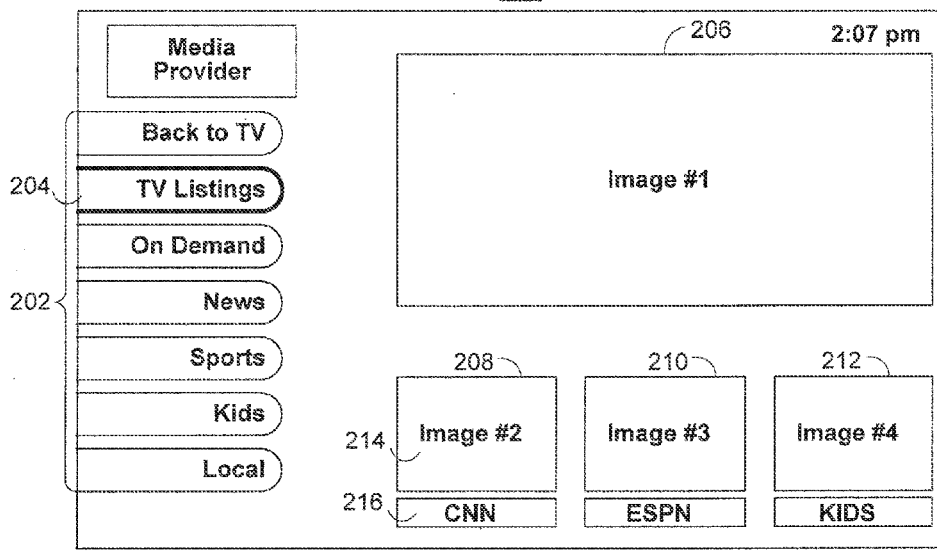

One of the functions of the media guidance application is to provide media listings and media information to users. FIGS. 1-2 show illustrative display screens that may be used to provide media guidance, and in particular media listings. The display screens shown in FIGS. 1-2, 7A-B, 9A-B, and 12A-C may be implemented on any suitable device or platform. While the displays of FIGS. 1-2, 7A-B, 9A-B, and 12A-C are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell it the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining, listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 121 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,219,714, issued May 29, 2001, which are hereby incorporated by reference herein in their entireties. PIG displays may be included in other media guidance application display screens of the present invention.

Advertisement 124 may provide an advertisement for media content that, depending on a user's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,338,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or trays of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media, content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different slices (i.e., listing 206 is larger than listings 208, 210, and 212), but if desired, all the listings may be the same site. Listings may be of different sites or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
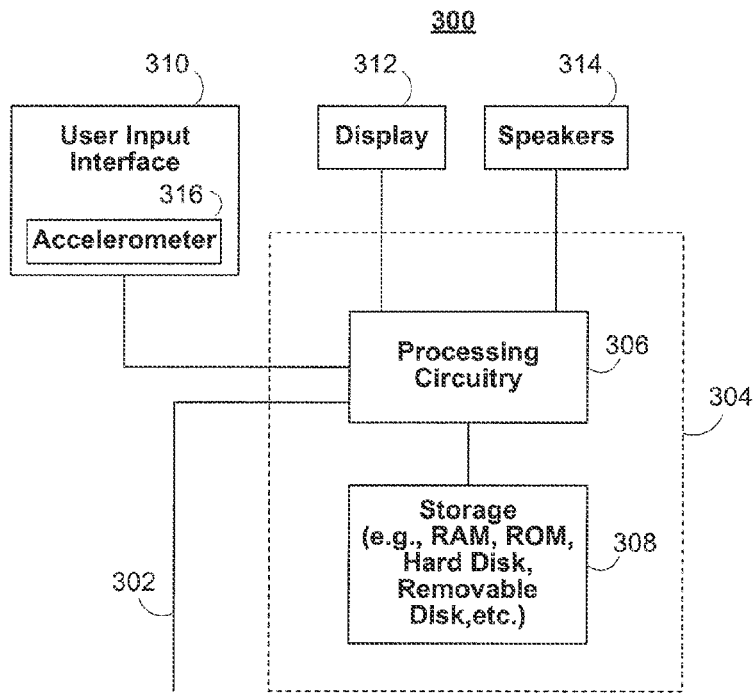
FIG. 3 shows an illustrative user equipment device in accordance with another embodiment of the invention.

Users may access media content and the media guidance application (and its display screens described above and below) from one or more of their user equipment devices. FIG. 3 shows a generalised embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 300 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 300 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control, circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 than is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 306 may be used to store various types of media described herein and guidance application data, including program information, guidance application settings, user preferences or profile information, or other data used in operating the guidance application. Non-volatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals so MPEG signals for storage) may also be provided. Control circuitry 304 may also include scaler circuitry for upconverting and down converting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialised processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. In some embodiments, the user input interface 310 may contain an accelerometer 316. When the user moves the user input interface 310 containing the accelerometer 316, the accelerometer 316 may transmit information about the user input interface's motion and orientation to the user equipment device 300. In some embodiments, the user input interface 310 may include a gyroscope (not shown) in addition to or instead of accelerometer 316.

For example, the user input interface 310 containing the accelerometer 316 may be a wand-like device, similar to the user input interface used in the Nintendo Wii. In one embodiment, the wand-like device may be in the shape of a rectangular prism. In other embodiments, the wand-like device may be in the shape of a triangular prism, sphere, or cylinder, or the wand-like device may narrow gradually from one end to the other, like a pyramid or cone. If the user holds the wand-like device and swings his arm up, the accelerometer 316 may transmit information indicating an upward motion and an upward orientation of the point on the wand-like device farthest away from the user. If the user holds the wand-like device and swings his arm down, the accelerometer 316 may transmit information indicating a downward motion and a downward orientation of the point on the wand-like device farthest away from the user. If the user holds the wand-like device and swings his arm parallel to the ground, the accelerometer 316 may transmit information indicating a lateral motion and an orientation of the wand-like device parallel to the ground. The user may move and change the orientation of the wand-like device in any combination of upward, downward, and lateral arm motions. The user may also move and change the orientation of the wand-like device by moving only his wrist and not his entire arm, such as by rotating his wrist up and down, side to side, or in a circular motion while holding the wand-like device.

Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). It another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In yet other embodiments, the media guidance application is downloaded and interpreted or otherwise run by an interpreter or virtual machine (run by control circuitry 304). In some embodiments, the guidance application may be encoded in the ETV Binary interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
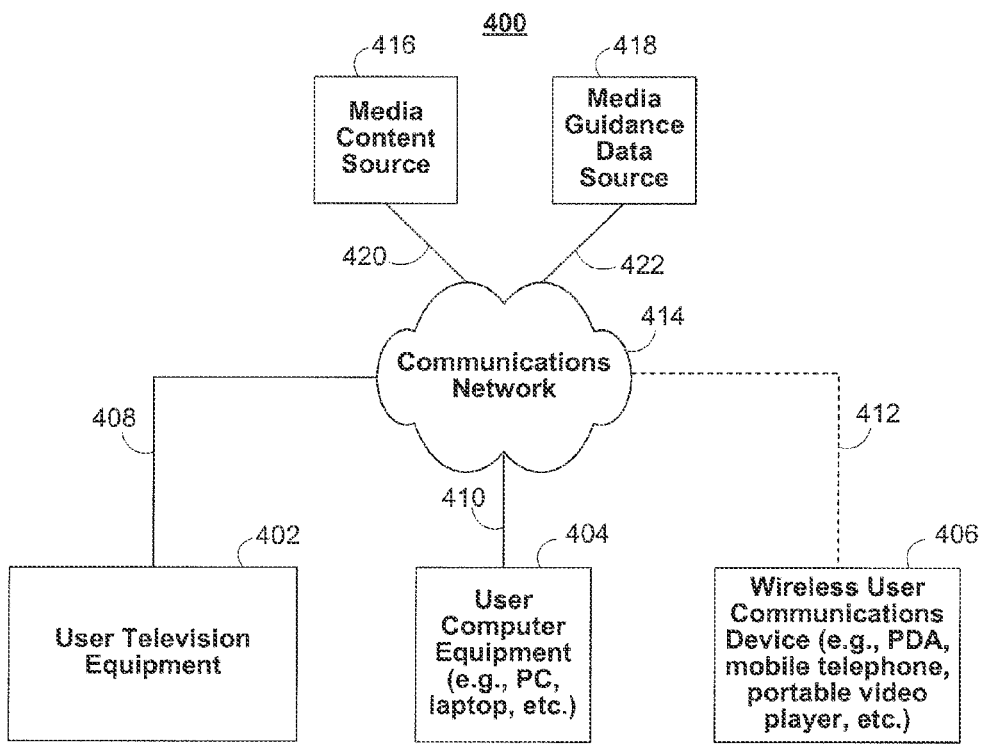
FIG. 4 is a diagram of an illustrative cross-platform interactive media system in accordance with another embodiment of the invention.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a stand-alone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment, or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that it the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more or these communication paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchange over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each or these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcaster' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data scarce 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalised example of FIG. 4.

In one approach, user equipment devices may communicate with each other within a noise network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

In some embodiments, media guidance application objects or media guidance objects may appear to be displayed in different planes. In particular, one of the media guidance objects may be displayed in a first plane (e.g., the media guidance object appears flat on the screen) and other media guidance objects may be displayed in a second plane (e.g., the media guidance objects appear as though they are in front of the screen or behind the screen).

As defined herein, the term media guidance object or media guidance application object means any website, live video feed, or recorded video feed playback or visual representation of media guidance application data such as a visual representation of a user profile, a media asset, previously recorded media asset, media asset recommendation, email message, notification, reminder, scheduled recording, favorite channel, photograph, icon, sketch, Short Message Service (SMS) message, Multimedia Messaging Service (MMS) message, service provider message, new media asset release, media category, a queue that includes media assets to be viewed at a future time, a playlist of media assets, or home video, or any combination of the same.

In a stereoscopic media guidance application, the stereoscopic effect may be achieved by generating a first image to be viewed with a user's right eye and generating a second image to be viewed with the user's left eye. The two images are superimposed to produce a stereoscopic image. In the stereoscopic image, some objects appear to be closer to the user, and other objects appear to be farther away. In order to separate the images presented to each of the user's eyes, the user may view the stereoscopic media guidance application through a stereoscopic optical device.

Figure 5A:
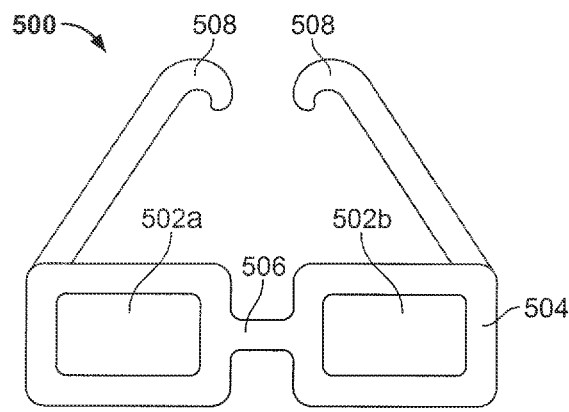
FIG. 5A shows an illustrative stereoscopic optical device in accordance with an embodiment of the invention.

FIG. 5A shows an illustrative stereoscopic optical device in accordance with an embodiment of the invention. In particular, stereoscopic optical device 500 may be structured like a pair of eyeglasses. Stereoscopic optical device 500 may have a first opening 502a for a user's right eye and a second opening 502b for the user's left eye. When the user looks through opening 502a, the user only sees the image generated for the user's right eye. Similarly, when the user looks through opening 502b, the user only sees the image generated for the user's left eye. Openings 502a and 502b may be surrounded by a frame structure 504. Frame structure 504 may include a bridge 506 than may rest on the user's nose when the user wears stereoscopic optical device 500. Stereoscopic optical device 500 may also have sidepieces 508 that run along the side of the user's head and hook over the user's ears. Sidepieces 308 may be attached to frame structure 504 by screws, hinges, glue, or any other suitable attachment means. In some embodiments, sidepieces 508 may be folded over behind, frame structure 504 when the user is not wearing stereoscopic optical device 500.

In one embodiment, frame structure 504, bridge 506, and sidepieces 508 may be made of plastic. In another embodiment, frame structure 504, bridge 506, and sidepieces 508 may be made of metal. Any other suitable material may be used to make frame structure 504, bridge 506, and sidepieces 508. In some embodiments, frame structure 504, bridge 506, and sidepieces 508 may all be made of the same material. In other embodiments, each of frame structure 504, bridge 506, and sidepieces 508 may be made of a different material. It still other embodiments, one of frame structure 504, bridge 506, and sidepieces 508 may be made of a different material than the other two parts.

In some embodiments, opening 502a may be covered by a first lens and opening 502b may be covered by a second lens. The lenses may be made of liquid crystal or some other suitable material. In some embodiments, the images seen through each of the lenses are superimposed by blocking and unblocking the lenses at appropriate times. When a lens is blocked, visible light is prevented from passing through the lens. When a lens is unblocked, visible light is allowed to pass through the lens.

In some embodiments, a transmitter on a user equipment device may transmit a first signal that is received with a sensor. In response to receiving the first signal, the first lens is blocked and the second lens is unblocked. Then a second signal may be transmitted by the transmitter and received by the sensor. In response to receiving the second signal, the first lens is unblocked and the second lens is blocked. The transmitter, sensor, and signals will be described in more detail below in relation to FIG. 8.

In some embodiments, the lenses may be blocked and unblocked using a shuttering process. For example, the process of blocking and unblocking the lenses described above may be repeated many times per second, such that persistence of vision causes the user to be oblivious to the shuttering of the lenses and, instead see a continuous stereoscopic image. In some embodiments, the blocking and unblocking of a lens occurs at a rate of approximately 60 times per second. In other embodiments, the blocking and unblocking may occur at a lower or faster rate. For example, the blocking and unblocking may occur at a rate of approximately 30 times per second.

Figure 5C:
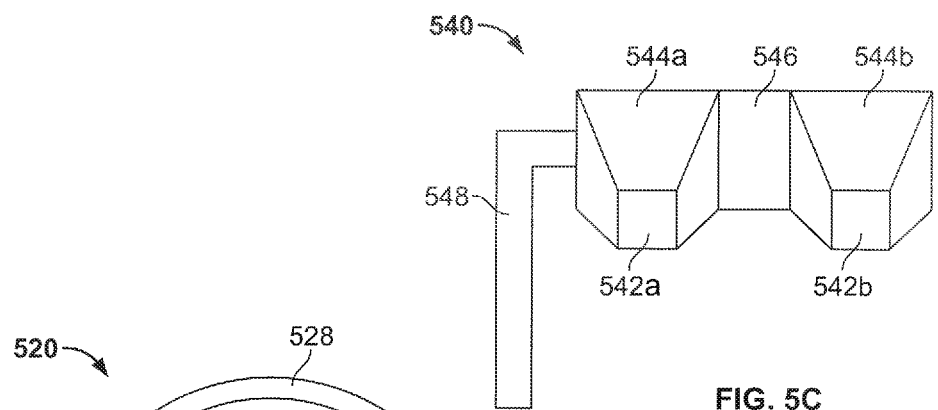
FIG. 5C shows an illustrative stereoscopic optical device in accordance with a third embodiment of the invention.
Figure 5B:
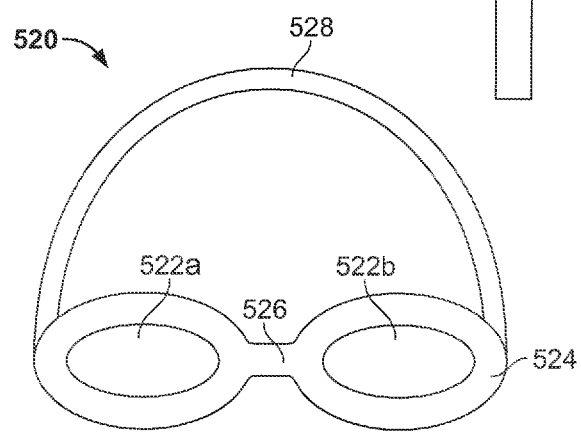
FIG. 5B shows an illustrative stereoscopic optical device in accordance with another embodiment of the invention.

FIG. 5B shows an illustrative stereoscopic optical device in accordance with another embodiment of the invention. In particular, stereoscopic optical device 520 may be structured like a pair of goggles. Stereoscopic optical device 520 may have a first opening 522a for a user's right eye and a second opening 522b for the user's left eye. When the user looks through opening 522a, the user only sees the image generated for the user's right eye. Similarly, when the user looks through opening 522b, the user only sees the image generated for the user's left eye. Openings 522a and 522b may be surrounded by a frame structure 324. Frame structure 524 may include a bridge 526 that may rest on the user's nose when the user wears stereoscopic optical device 520. Stereoscopic optical device 520 may also have a baud 528 that encircles the user's head to hold stereoscopic optical device 520 in place. Band 528 may be attached to frame structure 524 by screws, hinges, glue, or any other suitable attachment means.

In one embodiment, frame structure 524 and bridge 526 may be made of plastic. In another embodiment, frame structure 524 and bridge 525 may be made of metal. Any other suitable material may be used to make frame street are 524 and bridge 525. In some embodiments, frame structure 524 and bridge 526 may be made of the same material. In other embodiments, frame structure 524 and bridge 526 may be made of different materials.

In some embodiments, band 528 may be made of a rigid material, such as plastic or metal. In other embodiments, band 528 may be made of an elastic material, such as robber or latex. The length of band 528 may be adjustable so that stereoscopic optical device 520 may be worn by users of different sites. In some embodiments, opening 522a may be covered by a first lens and opening 522b may be covered by a second lens. The lenses may be made of liquid crystal or some other suitable material. In some embodiments, the images seen through each of the lenses are superimposed by blocking and unblocking the lenses at appropriate times in the manner described above in relation to FIG. 5A.

FIG. 5C shows an illustrative stereoscopic optical device in accordance with a third embodiment of the invention. In particular, stereoscopic optical device 540 may be structured like a pair of opera glasses. Stereoscopic optical device 540 may have a first opening 542a for a user's right eye and a second opening 542b for the user's left eye. When the user looks through opening 542a, the user only sees the image generated for the user's right eye. Similarly, when the user looks through opening 542b, the user only sees the image generated for the user's left eye. Openings 542a and 542b may be surrounded by frame structures 544a and 544b, respectively. Frame structures 544a and 544b may be connected by a bridge 546 that may rest on the user's nose when the user wears stereoscopic optical device 540. The length of bridge 546 may be adjustable so than stereoscopic optical device 540 may be uses by users of different sizes.

In some embodiments, frame structures 544a and 544b and bridge 546 may be made of plastic, paper and/or metal. Any other suitable material may be used to make frame structures 544a and 544b and bridge 546. In some embodiments, frame structures 544a and 544b and bridge 546 may be made of the same material. In other embodiments, frame structures 544a and 544b and bridge 546 may be made of different materials. In some implementations, stereoscopic optical device 540 may be provided on a sheet of paper and cut out based on specified regions. Stereoscopic optical device 540 may be formed by joining and folding sections of the cut out object as shown and described below in relation to FIG. 5D. Stereoscopic optical device 540 may be configured to be positioned on a users face such that when in a particular orientation, second opening 542b may allow visible light to pass from the user's right eye and only see a portion of a superimposed stereoscopic image generated for viewing with the user's right eye. Also, when in the particular orientation, first opening 542a may allow visible light to pass from the user's left eye and only see a portion of a superimposed stereoscopic image generated for viewing with the user's left eye. When seen together, the user's brain combines the images and perceives the combined images as a three dimensional object (discussed it more detail below).

Stereoscopic, optical device 540 may also have a handle 548 that the user may hold while looking through openings 542a and 542b. Handle 548 may be attached to either frame structure 544a or frame structure 544b by screws, hinges, glue, or any other suitable attachment means. The length of handle 548 may be adjustable so that stereoscopic optical device 540 may be used by users of different sites. Handle 548 may be made of plastic, metal, rubber, or any other suitable material or combination of materials. In some embodiments, handle 548 may be folded over behind frame structures 544a and 544b when stereoscopic optical device 540 is not being used.

In some embodiments, opening 542a may be covered by a first lens and opening 542b may be covered by a second lens. The lenses may be made of liquid crystal or some other suitable material. In some embodiments, the images seen through each of the lenses are superimposed by blocking and unblocking the lenses at appropriate times in the manner described above in relation to FIG. 5A.

Figure 5D:
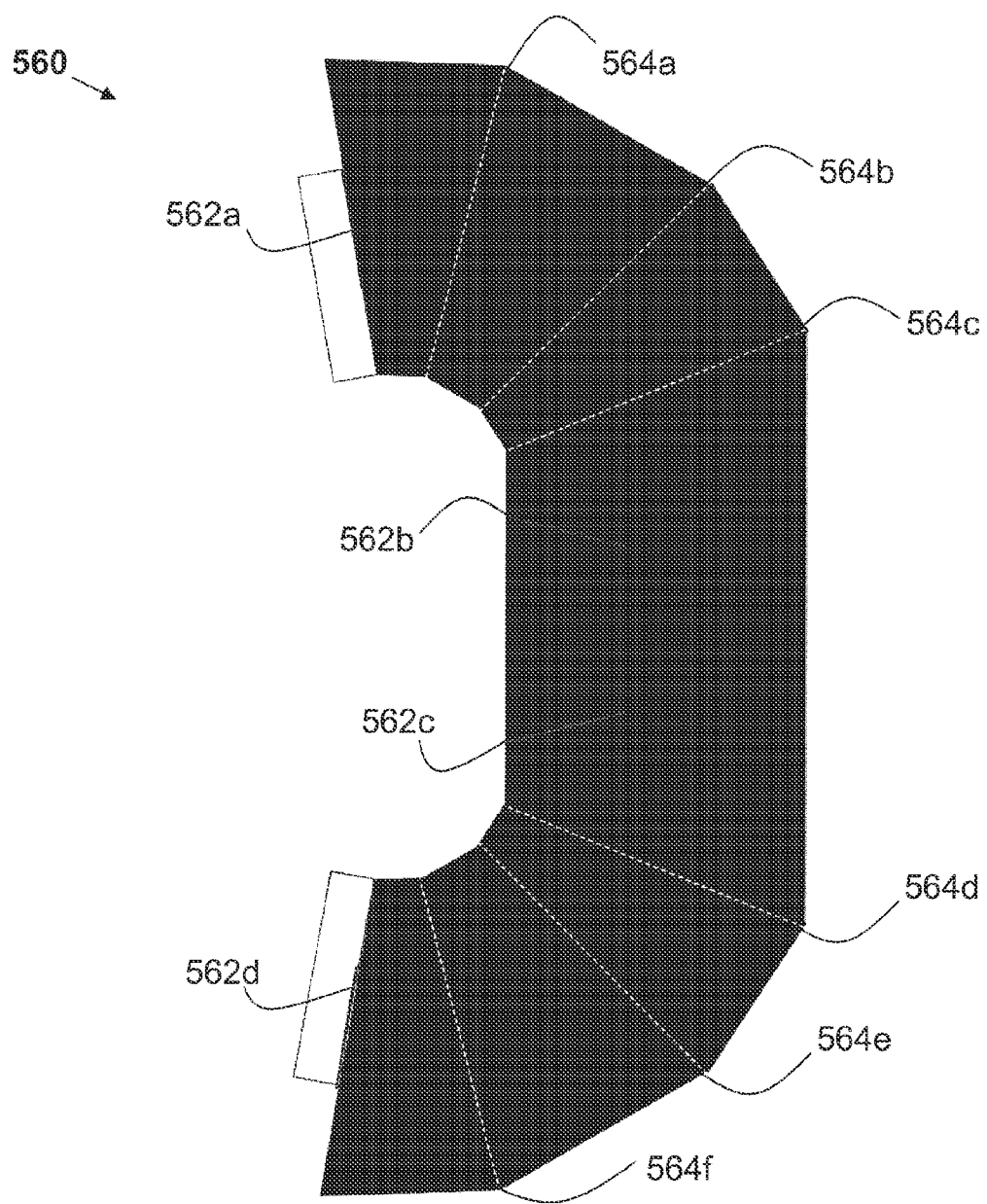
FIG. 5D shows a pattern for an illustrative stereoscopic optical device in accordance with an embodiment of the invention.

FIG. 5D shows a pattern 560 for an illustrative stereoscopic optical device in accordance with an embodiment of the invention. Pattern 560 may be cut out and assembled to form a stereoscopic optical device similar to stereoscopic optical device 540 discussed above. After the outline of pattern 560 is cut out, slits may be cut along lines 562a-d. Pattern 560 say then be folded along dotted lines 564a-f such that the black sides face one another and form a frame structure. The frame structure may be held together by inserting silt 562a into slit 562b and inserting slit 562d into slit 562c.

The stereoscopic optical device formed from pattern 560 may be used in embodiments where the images for each eye are presented side by side. For example, the image for the left eye may be displayed in a left portion of the screen and the image for the right eye may be displayed on a right portion of the screen at a suitable distance away from the left portion of the screen. In some implementations, two separate screens may be provided each configured to display the image for the respective eye. A user may look through the wider side of the frame structure and frame the image for each eye by closing one eye at a time. The user may see one stereoscopic image when both eyes are opened.

Stereoscopic optical devices, such as those described above in relation to FIGS. 5A-D, may be used when a user views a stereoscopic media guidance application. Illustrative stereoscopic media guidance application display screens are described in detail below in relation to FIGS. 6A-B and 7A-B.

Figure 6A:
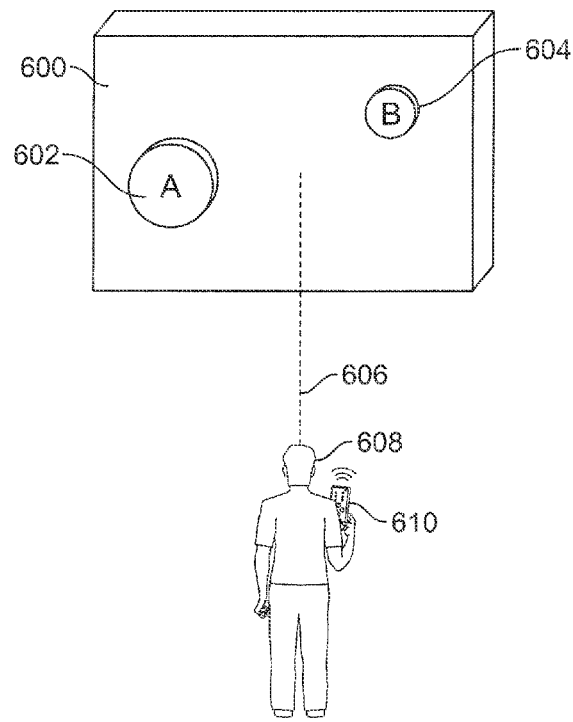
FIG. 6A shows an illustrative front view of a display screen of media objects appearing in different planes in accordance with an embodiment of the invention.

FIG. 6A shows an illustrative front view of a display screen 600 of media objects appearing in different planes in accordance with an embodiment of the invention. A user 608 viewing the display screen 600 sees a first selectable media guidance object 602 and a second selectable media guidance object 604. First selectable media guidance object 602 appears closer to the user than second selectable media guidance object 604 when viewed along an axis 606 that is normal to the display screen 600.

Figure 6B:
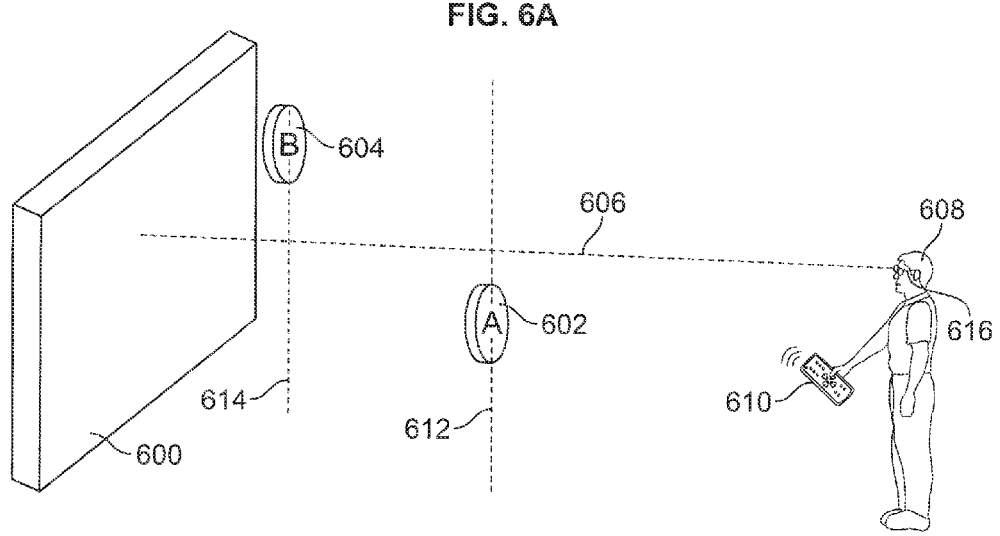
FIG. 6B shows an illustrative side view of the display screen illustrated in FIG. 6A, assuming the media objects are actually three-dimensional, in accordance with an embodiment of the invention.

The user's perception of first and second selectable media guidance objects 602 and 604 is further illustrated in FIG. 6B. FIG. 6B shows an illustrative side view of the display screen illustrated in FIG. 6A, assuming first and second selectable media guidance objects 602 and 604 are actually three-dimensional. First selectable media guidance object 602 is displayed in a first plane, indicated by dotted line 612. Second selectable media guidance object 604 is displayed in a second plane, indicated by dotted line 614, that intersects axis 606 in a different location than first plane 612. The user may view display screen 600 through a stereoscopic optical device 616 similar to those described above in relation to FIGS. 5A-C. The user may select at least one of first and second selectable media guidance objects 602 and 604 with a user input device 610, such as a user input device described above in relation to FIG. 3. Selection of selectable media guidance objects is described in detail below in relation to FIGS. 9A-B and 10.

Figure 7A:
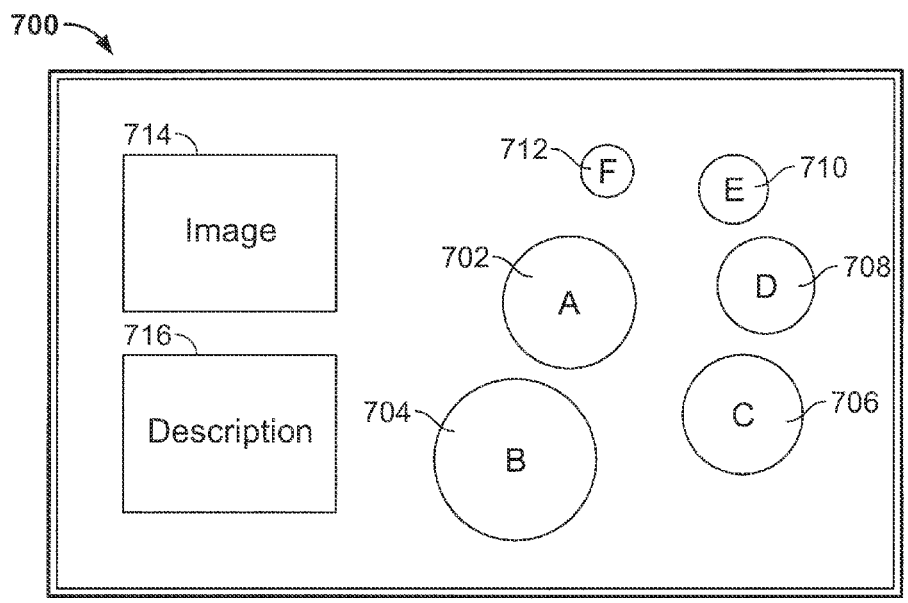
FIG. 7A shows an illustrative display screen of media objects displayed in different planes in accordance with an embodiment of the invention.

A plurality of selectable media guidance objects may be arranged in a stereoscopic media guidance application display, as discussed below in relation to FIGS. 7A-B. FIG. 7A shows an illustrative display screen 700 of selectable media objects displayed in different planes in accordance with an embodiment of the invention. Selectable media guidance objects 702, 704, 706, 708, 710, and 712 may be arranged based on a planetary system. In particular, selectable media guidance object 702 may be in the position of a sun in a planetary system, and selectable media guidance objects 704, 706, 708, 710, and 712 may be in positions of planets orbiting the sun. More specifically, selectable media guidance object 702 may be perceived by the user when using the stereoscopic optical device as being in a center region in 3D space and selectable media guidance objects 704, 706, 708, 710, and 712 may be perceived by the user as surrounding selectable media guidance object 702 in 3D space.

In some implementations, selectable media, guidance objects 704, 706, 708, 710, and 712 may be positioned and viewed as being on the same level (or height) as selectable media guidance object 702 or each selectable media guidance objects 704, 706, 708, 710, and 712 may appear to be at a different level. In some implementations, selectable media guidance objects 704, 706, 708, 710, and 712 may be positioned and viewed as being equidistant from selectable media guidance object 702 or each of selectable media guidance objects 704, 706, 708, 710, and 712 may appear to be at different degrees of distance. In some embodiments, the distance between any one of the selectable media guidance objects 704, 706, 708, 710, and 712 and the selectable media guidance object 702 may correspond to how relevant selectable media guidance objects 704, 706, 708, 710, and 712 are to the selectable media guidance object 702.

In some embodiments, selectable media guidance objects 704, 706, 708, 710, and 712 may revolve around selectable media guidance object 702. For example, each selectable media guidance object 704, 706, 708, 710, and 712 may move in time at a particular speed (which may be predetermined or selected by the user) in a circular magnet around selectable media guidance object 702. In some implementations, selectable media guidance objects 704, 706, 708, 710, and 712 may move when processing circuitry 306 detects a movement by the input device in a certain direction. For example, when the user jerks the input device once to the right, processing circuitry 306 may reposition selectable media guidance objects 704, 706, 708, 710, and 712 by rotating them clockwise around selectable media guidance object 702.

Each of selectable media guidance objects 702, 704, 706, 708, 710, and 712 may be displayed in a different plane that intersects a normal of the screen at different points. For example, selectable media guidance object 702 may appear to the user as first selectable media guidance object 602 appears to the user (e.g., may appear closer in 3D space to the user) and selectable media guidance object 712 may appear to the user as second selectable media guidance object 704 appears to the user (e.g., may appear further away in 3D space from the user). In some implementations, selectable media guidance objects 702, 704, 706, 708, 710, and 712 may be spherical, rectangular, triangular, or any other geometrical shape.

In some embodiments, the selectable media guidance objects may appear semi-transparent, partially-transparent or fully transparent. For example, selectable media object 706 may appear closer in 3D space to the user than selectable media object 708. Selectable media object 706 may partially or fully obstruct the user's view of selectable media, object 708. Selectable media object 706 may appear semi-transparent, partially-transparent or fully transparent so that the user may still see selectable media object 708 through selectable media object 706. In particular, the user may see both selectable media object 708 and selectable media object 706 in the same portion of the screen. In some implementations, the level of transparency may be adjusted (e.g., by the user or the system). For example, the user may set a high level of transparency which may cause the transparent effect to be closer to fully transparent (e.g., to appear closer to being a window) allowing more visible light to pass through. Alternatively, the user may set a lower level of transparency which may cause the transparent effect to be closer to opaque or translucent (e.g., to appear closer to being a frosted window) allowing less visible light to pass through such that one object appears slightly more opaque than another.

In some embodiments, a selectable media object may overlap more than one other selectable media object. For example, selectable media object 706 may overlap both selectable media object 708 and selectable media object 710. In some embodiments, selectable media object 708 may overlap selectable media object 710 and be overlapped by selectable media object 706. It should be understood that the overlap between selectable media objects may involve only parts of each selectable media object or one or more selectable media objects in their entirety.

In some embodiments, selectable media object 706 may appear semi-transparent, partially-transparent or fully transparent in areas that overlap selectable media object 708 and opaque in other non-overlapping areas. In other embodiments, selectable media object 706 may appear semi-transparent or fully transparent in its entirety, even in areas that do not overlap other selectable media objects.

In some embodiments, selectable media, guidance object 702 may identify a group of media assets, and each of selectable media guidance objects 704, 706, 708, 710, and 712 may correspond to one of the media assets of the group. For example, selectable media guidance object 702 may identify a group of television programs and each of selectable media guidance objects 704, 706, 708, 710, and 712 may represent a different television progress in the group. In particular, selectable media guidance object 702 may identify a group of television programs available or that are broadcast, at a particular time or from a particular source (e.g., broadcast, satellite, Internet, terrestrial) and each of selectable media guidance Objects 704, 706, 708, 710, and 712 may represent a different media asset that is available or broadcast at the particular time or from the particular source. Similarly, selectable media guidance object 702 may identify a group of cast members or directors of a media asset and each of selectable media guidance objects 704, 706, 708, 710, and 712 may represent a different one of the cast members or directors in the group. Selectable media guidance objects 704, 706, 708, 710, and 712 (discussed above and below) may represent media assets with images, videos, text, audio files, website or other representation unique to a media asset that identifies the media asset to the user when the user perceives the media asset representation provided by one or selectable media guidance objects 704, 706, 708, 710, and 712.

In some implementations, selectable media, guidance object 702 may identify a genre of media assets and each of selectable media guidance objects 704, 706, 708, 710, and 712 may represent a different one of the media assets in the group. For example, selectable media guidance object 702 may identify a genre of movies, such as comedies or action movies, and each of selectable media guidance objects 704, 706, 708, 710, and 712 may represent a different movie title in that genre. In some embodiments, selectable media guidance object 702 may identify songs, musical artists, categories, emails a user receives, favorite media assets, playlists or video games. For example, selectable media guidance object 702 may identify a playlist of media assets and each of selectable media guidance objects 704, 706, 708, 710, and 712 may represent a different one of the media assets in the playlist or other media assets of similar genre or duration.

In some embodiments, selectable media guidance object 702 may identify a user profile, and each of selectable media guidance objects 704, 706, 708, 710, and 712 may represent a different recommendation for the user profile. The recommendations may be based on the viewing history associated with the user profile, or the recommendations may be social networking recommendations. In some embodiments, the recommendations may be recommendations for related media assets, such as similar movies or documentaries on a certain topic. In some embodiments, the recommendations may be recommendations for products that may interest the user, such as movie posters, DVDs, or sports memorabilia.

In some embodiments, selectable media guidance object 702 may identify a media asset, and, each of selectable media guidance objects 704, 706, 708, 710, and 712 may include advertisements related to the identified media asset. For example, if the identified media asset is a song, the advertisements may relate to local concerts given by the artist that sings the song or CDs containing the song. If the identified media asset is a sporting event, the advertisements may relate to food that the user may want to order while watching the event or jerseys of the teams that will be playing. In some embodiments, the advertisements may contain discounts for the advertised items. In some embodiments, some of the displayed advertisements stay not be directly related to the identified media asset and may instead be local or regional advertisements.

In some embodiments, selectable media guidance object 702 may identify a media asset, and each of selectable media guidance objects 704, 706, 708, 710, and 712 may represent interactions associated with the identified media asset. For example, if selectable media guidance object 702 identifies a television program, selectable media guidance object 704 may represent an option to recommend the television program to another user, and selectable media guidance object 706 may contain a hyperlink that may allow the user to obtain more information about the television program. In addition, selectable media guidance object 708 may represent an option to chat with other users about the television program, while selectable media guidance object 710 may invite the user to play a trivia game about the television program.

In some embodiments, a user selection of selectable media guidance object 702 (the "sun" object) may set the mode for which group selectable media guidance object 702 identifies. The mode selected for the "sun" object may determine which "planet" objects to display. For example, the user may set the mode for Selectable media guidance object 702 to represent or identify a group of actors in a particular media asset and may change that mode to have selectable media guidance object 702 represent or identify a group of television programs broadcast at a particular time. In some embodiments, processing circuitry 306 may detect an up and down movement on the input device (e.g., based on input processing circuitry 300 receives from an accelerometer and/or gyroscope) and as a result may change the mode of the "sun" object and thereby the "planet" objects that may be displayed. In some implementations, the mode set for the sun object may be changed based on a particular direction the input device is jerked towards. For example, when processing circuitry 306 determines that the input device is jerked towards a direction of a line that forms a 45 degree angle relative to a normal of the display, processing circuitry 306 may set the mode of selectable media guidance object 702 to be a television schedule and when processing circuitry 306 determines that the input device is jerked towards a direction of a line that forms a 90 degree angle relative to a normal of the display, processing circuitry 306 may set the mode of selectable media guidance object 702 to be actors in a media asset. More specifically, each mode or selectable media guidance object 702 may be associated with a different direction in which the input device is moved or jerked.

In some embodiments, the user may select one of the "planet" objects to resume the new "sun" object, and the "planet" object may knock the "sun" object off the screen (e.g., the 3D space) like a billiard ball and replace it while new "planet" objects appear. In other embodiments, the user may drag a "planet" object to the position of the "sun" object, making the "planet" object the new "sun" object.

In some embodiments, an image box 714 and a description box 716 may be displayed with selectable media guidance objects 702, 704, 706, 708, 710, and 712. Image box 714 may display an image associated with one of selectable media guidance objects 702, 704, 706, 708, 710, and 712. In some embodiments, the image in image box 714 may be a still image. For example, the still image may be a photograph of an actor or a screen shot from a television show. In other embodiments, the image in image box 714 may be a moving image, such as a rotating image or a streaming clip of content. In some embodiments, the moving image may be a movie trailer or an interview with a cast member.

Description box 716 may display text describing one of selectable media guidance objects 702, 704, 706, 708, 710, and 712. In some embodiments, the text in description box 716 may be sized such that all of the text may be viewed at once. In other embodiments, the user may manually scroll up and down or side to side within description box 716 in order to view all of the text. In still other embodiments, the text in description box 716 may automatically scroll up and down or side to side so that the user may read all of the text. In yet other embodiments, some text may be displayed in description box 716, and the user may select description box 716 in order to read the rest of the text. The text in description box 716 may relate to any or all of selectable media guidance objects 702, 704, 706, 708, 710, and 712. For example, the text in description box 716 may be a biography of an actor, a plot synopsis, lyrics to a song, or a description of a video game.

In some embodiments, selectable media guidance objects 702, 704, 706, 708, 710, and 712 themselves may contain images or text, or both. The images and text in selectable media guidance objects 702, 704, 706, 708, 710, and 712 may be displayed in any or all of the manners described above in relation to image box 714 and description box 716.

Figure 7B:
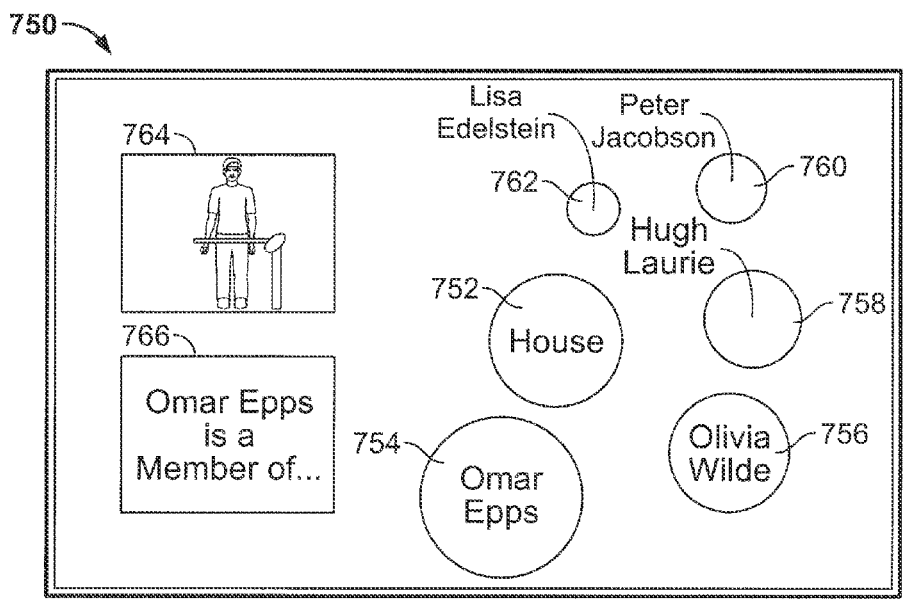
FIG. 7B shows an illustrative display screen of cast member representations displayed in different planes in accordance with an embodiment of the invention.

FIG. 7B shows an illustrative display screen 750 of cast member representations displayed in different planes that intersect the normal of the screen at different locations in accordance with an embodiment of the invention. In particular, selectable media guidance objects 752, 754, 756, 758, 760, and 762 may be arranged based on a planetary system. Each of selectable media guidance objects 752, 754, 756, 758, 760, and 762 may be displayed in a different plane that intersects a normal of the screen at a different point or location. Selectable media guidance object 752 may be the "sun" object and identifies a television program, House. Selectable media guidance object 752 may be the same or have similar functionality as selectable media guidance object 702 (FIG. 7A). Selectable media guidance objects 754, 756, 768, 760, and 762 may be "planet" objects and may correspond to cast members in the television program "House" identified by selectable media guidance object 752. Selectable media guidance objects 754, 756, 758, 760, and 762 may be the same or have similar functionality as selectable media guidance objects 704, 706, 708, 710, and 712 (FIG. 7A). The "planet" objects 754, 756, 758, 760, and 762 may include photos of the cast members as well as the names of the cast members. In another embodiment, the "sun" object may identify a time of day, and the "planet" objects may correspond to programs scheduled for that time of day. In yet another embodiment, the "sun" object may identify a genre of movies, and the "planet" objects may correspond to movies belonging to that genre.

Image box 764 in FIG. 7B displays an image associated with the "sun" object, selectable media guidance object 752. In particular, the image in image box 764 may be a photo of Dr. House, the main character in the television program identified by the "sun" object. In another embodiment, the image in image box 764 may be a commercial for an upcoming episode of "House". In yet another embodiment, the image in image box 764 may be a photo of a cast member appearing in one of selectable media guidance objects 754, 756, 758, 760, and 762.

Description box 766 in FIG. 7B displays text associated with one of the "planet" objects. In particular, the text in description box 766 may be a biography of the cast member displayed in selectable media object 754, Omar Epps. In another embodiment, the text in description box 766 may generally describe the television show "House". In other embodiments, the text in description box 766 may be a plot synopsis of a previous or upcoming episode of "House".

Figure 8:
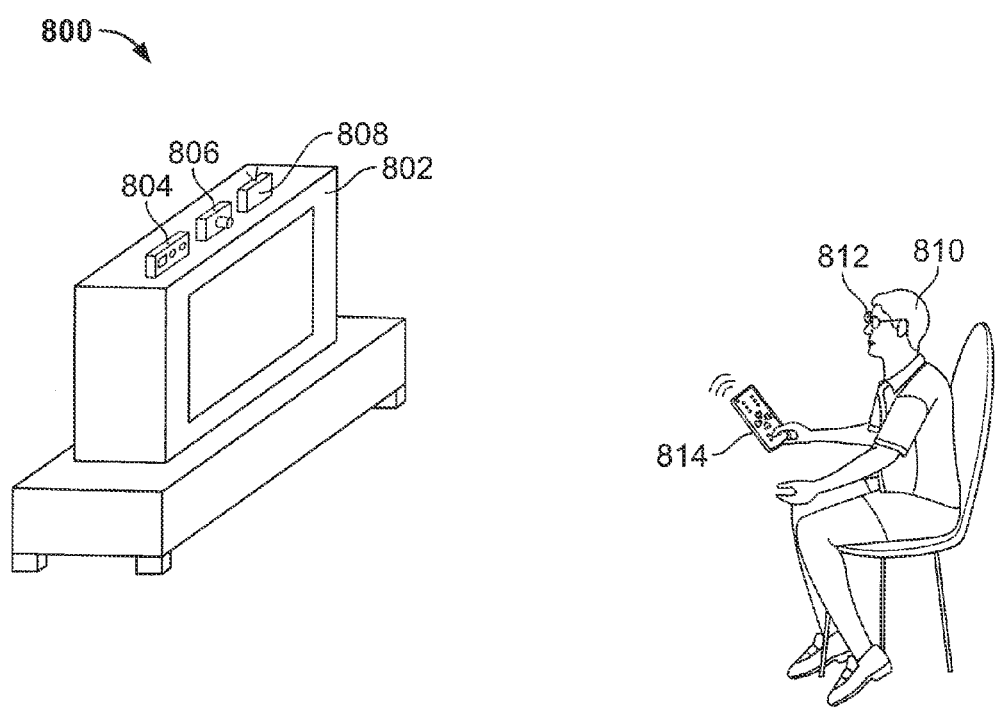
FIG. 8 shows an illustrative arrangement of user equipment devices and peripheral devices in accordance with an embodiment of the invention.

A stereoscopic media guidance application, such as those described above, may be displayed and navigated using a plurality or user equipment devices and peripheral devices. FIG. 8 shows an illustrative arrangement 800 of user equipment devices and peripheral devices in accordance with an embodiment of the invention. A stereoscopic media guidance application may be displayed on the screen of a television set 802. A user 810 may view the stereoscopic media guidance application through a stereoscopic optical device 812, such as one of the stereoscopic optical devices described above in relation to FIGS. 5A-C. A set top box 804 may be mounted on television set 802 or may be incorporated into television set 802. A camera 806 may also be mounted on or incorporated into television set 802. As referred to herein user television equipment may include each or all set top box 804, camera 806 and the television set 802 independently or jointly. Camera 806 may detect movements of user 810 or user input device 814. In some embodiments, camera 806 may be an infrared camera. The infrared camera may detect movements of user 810 by forming a thermal image of user 810. Alternatively, user input device 814 may emit an infrared light that may be detected by the infrared camera.

A transceiver 808 may also be mounted on or incorporated into television set 802. Transceiver 808 may also be included in the user television equipment referred to above and below. Transceiver 808 may be used to control stereoscopic optical device 812. For example, transceiver 808 may transmit infrared signals that are received by a sensor on stereoscopic optical device 812. The infrared signals may block and unblock the lenses on optical device 812 so that user 810 sees a stereoscopic image, as described above in relation to FIGS. 5A-C. For example, processing circuitry 306 may display an image on the screen for the user to view with only the left eye and accordingly may instruct transceiver 808 to send a message to the user's optical device to block the right lens and unblock the left lens. At a later time (e.g., milliseconds or microseconds), processing circuitry 306 may display an image on the screen for the user to view with only the right eye and accordingly may instruct transceiver 808 to send a message to the user's optical device to block the left lens and unblock the right lens.

Transceiver 808 may also receive signals from user input device 814. For example, user 810 may press a button on user input device 814 to select a displayed selectable media guidance object. User input device 814 may transmit a signal, such as an infrared signal, indicating a user selection that is received by transceiver 808. In some embodiments, transceiver 808 may work in tandem with camera 806 to detect movements of user 810 and user input device 814. For example, camera 806 may detect broad arm movements of user 810, while transceiver 808 receives information about the motion and orientation of user input device 814 gathered by an accelerometer inside user input device 814. Based on the information collected by camera 806 and transceiver 808, the stereoscopic media guidance application display may be modified, as discussed in detail below in relation to FIGS. 9A-B.

Figure 9A:
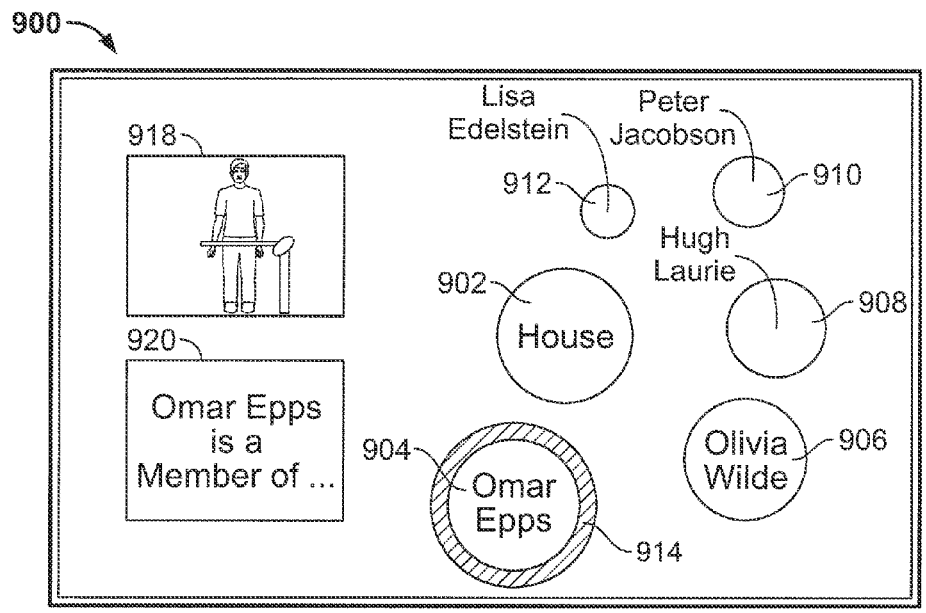
FIGS. 9A-B show illustrative configurations of media guidance objects on a display screen in accordance with an embodiment of the invention.
Figure 9B:
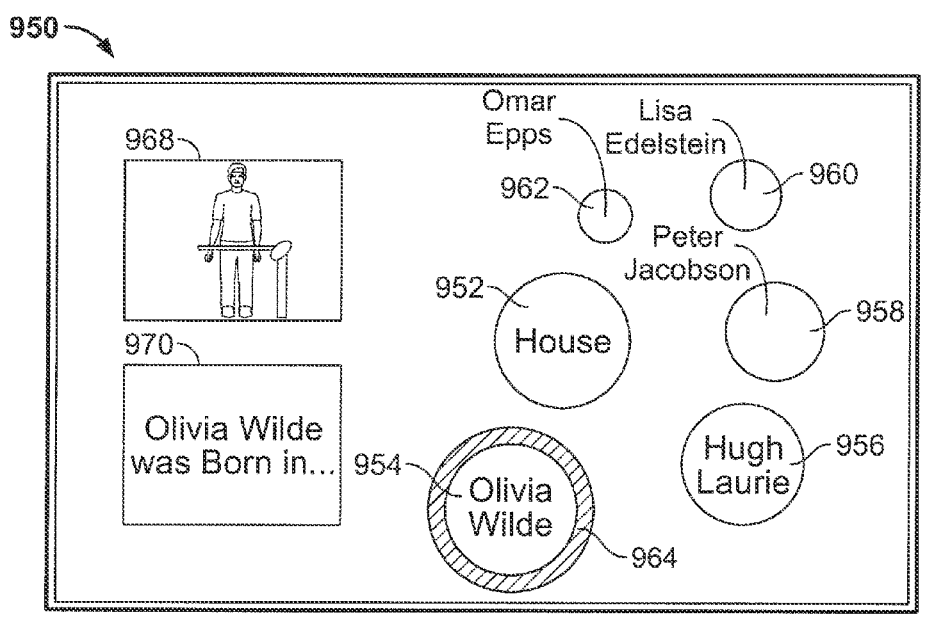

FIGS. 9A-B show illustrative configurations 900 and 950, respectively, of media guidance objects on a display screen in accordance with an embodiment of the invention. Configurations 900 and 950 are both planetary arrangements, as described above in relation to FIGS. 7A-B. In particular, selectable media guidance objects 902, 904, 906, 908, 910, and 912 in FIG. 9A and selectable media guidance objects 352, 954, 956, 958, 960, and 962 in FIG. 9B are arranged based on a planetary system and each have functionalities that are the same or similar to selectable media guidance objects 702, 704, 706, 708, 710, 712 and/or 752, 754, 756, 758, 760 and 762 (FIGS. 7A and 7B).

Each of selectable media guidance objects 902, 904, 906, 908, 910, and 912 in FIG. 9A and selectable media guidance objects 952, 954, 956, 958, 960, and 962 in FIG. 9B may be displayed in a different plane that intersects the normal of the screen at a different point. Selectable media guidance object 902 may be the "sun" object in FIG. 9A, and selectable media guidance object 952 may be the "sun" object in FIG. 9B. Although both "sun" objects are shown to identify a television program, "House", it should be understood that the sun objects may identify any group of media assets as discussed above. Images in image box 918 and 968 correspond to the "sun" object in their respective arrangements. Selectable media guidance objects 904, 906, 908, 910, and 912 in FIG. 9A and selectable media guidance objects 954, 956, 958, 960, and 962 may be "planet" objects and may correspond to cast members in "House".

Selectable media guidance object 904 in FIG. 9A may be surrounded by a visual indicator 914. In some embodiments, visual indicator 314 may be completely semi-transparent or transparent. In other embodiments, visual indicator 914 may be semi-transparent or transparent in areas that overlap a selectable media guidance object and opaque everywhere else.

Description box 920 displays text associated with selectable media guidance object 904, the selectable media guidance object brought into focus by visual indicator 914. In particular, the text in description box 920 is a biography of the cast member displayed in selectable media object 904, Omar Epps. In some embodiments, description box 920 and/or image box 918 may provide information associated with selectable media guidance object 902. In such circumstances, description box 920 and/or image box 918 may appear to lie in the same plane as the selectable media guidance object with which they are associated. For example, description box 920 and/or image box 918 may include information about the show "House" identified by selectable media guidance object 902 which may appear to lie in a plane that intersects the normal of the screen at a first location which makes selectable object 902 appear to be at a closer distance to the user than selectable media guidance object 912. Accordingly, description box 920 and/or image box 918 may also lie in the same plane as selectable media guidance object 902 and appear to be the same distance away from the user as media guidance object 902. This may allow the user to visually identify to which of the displayed selectable media guidance objects description box 920 and/or image box 918 correspond.

In some embodiments, description box 920 and/or image box 918 may appear in the plane or the screen while the selectable media guidance objects appear in planes in front of and/or behind the screen. In some embodiments, one or more selectable media guidance objects may appear in the plane of the screen while other selectable media guidance objects appear in planes in front of and/or behind the screen. For example, description box 920 and image box 918 may appear in the plane of the screen with selectable media guidance object 902 while the other selectable media guidance objects appear in planes in front of and behind the screen.

A user may change the position of visual indicator 914 in the stereoscopic media guidance application display. In some embodiments, the user may more visual indicator 914 using up, down, left, and right arrow keys or other buttons on a user input device. In other embodiments, the user may hold the user input device and move one of his arms in the direction he wants to move visual indicator 914. For example, if the user wants to move visual indicator 914 over to selectable media guidance object 906, the user may move his arm to the right. If the user wants to move visual indicator 914 over to selectable media guidance object 902, the user may raise his arm up. In some implementations, processing circuitry 306 may move the cursor around the screen based on a slow and steady speed at which the input device is moved (e.g., based on the user's arm movement) and may effect selection of change of mode in relation to a selectable media guidance object adjacent the position of the cursor based a fast and immediate speed at which the input device is moved (e.g., based on the user's jerk of the wrist movement in a particular direction).

In another embodiment, the visual indicator 914 may remain stationary while the "planet" objects move. For example, the user may move his arm in a circular motion to revolve the "planet" objects in FIG. 9A around the "sun" object. The result is illustrated in FIG. 9B. In FIG. 9B, processing circuitry 806 may shift the "planet" objects one position over in the clockwise direction compared to their respective positions in FIG. 9A. In particular, selectable media guidance object 954 representing cast member Olivia Wilde has shifted into visual indicator 964 in FIG. 9B, and the text in description box 970 is now a biography of Olivia Wilde. The selectable media guidance object 962 representing cast member Omar Epps has shifted behind the "sun" object, and all other "planet" objects 956, 958, and 960 have shifted clockwise accordingly to maintain the configuration illustrated in FIG. 9A. Navigation and modification of the stereoscopic media guidance application is discussed in more detail below in relation to FIGS. 10 and 11. It should be understood that the movement described above and below is in the 3D space (domain) so although the media guidance objects are repositioned on the 2D screen, when viewed through the stereoscopic optical device, the media guidance objects appear to be repositioned and moved into places closer and further away from the user in the 3D realm.

It should be understood that the size of the circles shown in FIGS. 7A, 7B, 9A and 9B represent different locations of the selectable media guidance objects in 3D space. For example, the size of the circle represents how close/far from the user a selectable media guidance object appears to be when viewed through a stereoscopic optical device. In particular, the larger the size of the circle, the closer to the user the selectable media guidance object appears to be and the smaller the size of the circle, the farther away from the user the selectable media guidance object appears to be. More specifically, selectable media guidance object 752 appears closer to the user when viewed through the stereoscopic optical device than selectable media guidance object 760 which is drawn to be smaller in size.

Figure 10:
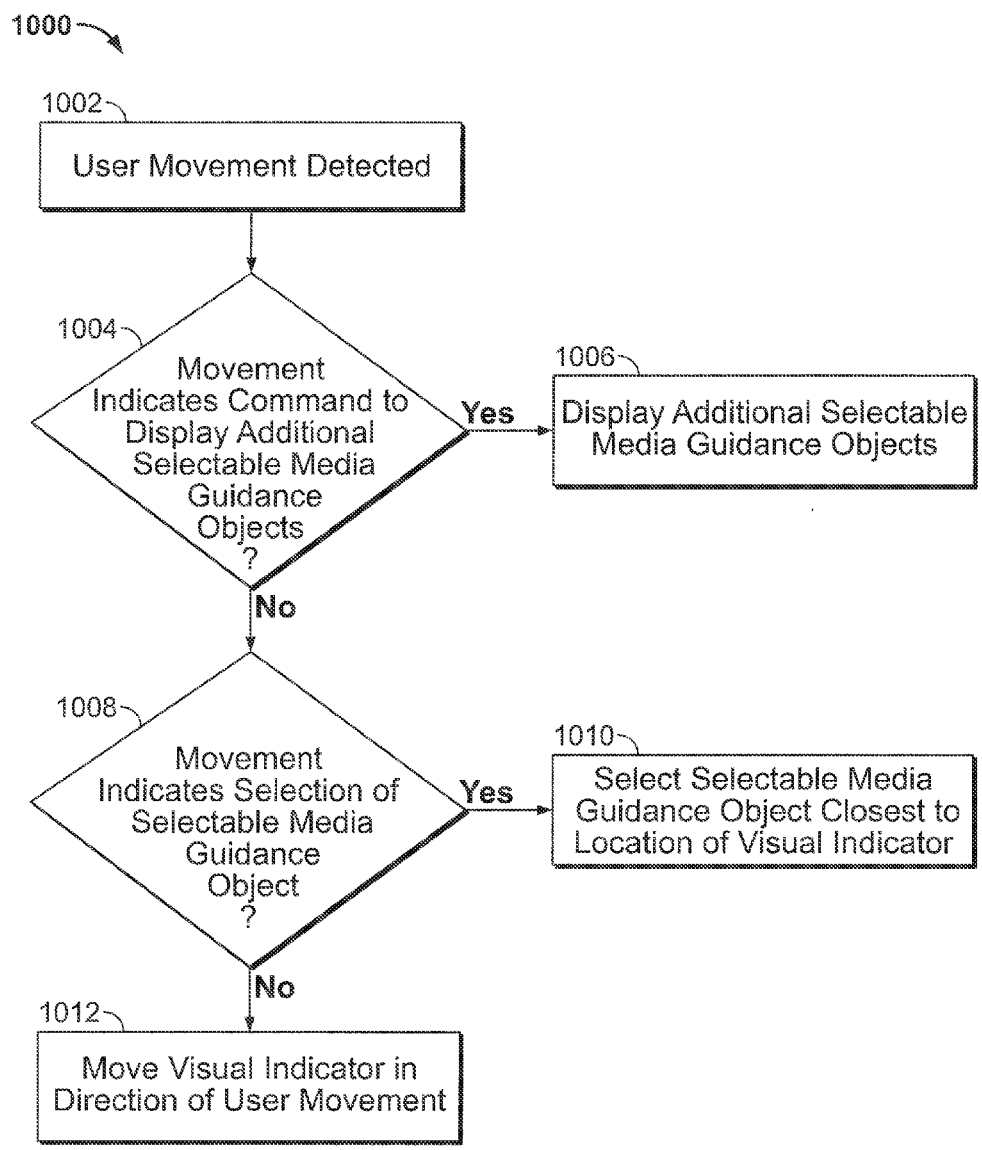
FIGS. 10-11 are illustrative flow diagrams for navigating a 3D media guidance application in accordance with embodiments of the invention.

FIG. 10 is an illustrative flow diagram 1000 for navigating a 3D media guidance application in accordance with an embodiment of the invention. At step 1002, a user movement is detested. For example, processing circuitry 306 may detect the user swinging his arms in a circular motion or from side to side.

At step 1004, it is determined whether the movement indicates a command to display additional selectable media guidance objects. For example, the user may point to or highlight a section of the display screen that says "more options". Processing circuitry 306 may also detect some predetermined motion, such as a quick lateral sweep or the user's arm, indicating that more options are desired. If it is determined at step 1004 that the movement does indicate a command to display additional selectable media guidance objects, the process proceeds to step 1006.

At step 1006, additional selectable media guidance objects are displayed. The additional selectable media guidance object's that may be displayed may appear in different planes from the selectable media guidance objects that are already displayed. For example, more program listings for a certain time of day may be displayed. Some of the program listings may appear in front of the display screen, and other program listings may appear behind the display screen. Alternately, more media assets of a certain genre may be displayed. Some of the media assets may appear in front of the display screen, and other media assets may appear behind the display screen.

In some embodiments, the additional selectable media guidance objects that are displayed may be of different media asset types than the selectable media guidance objects that are already displayed. In one embodiment, the "sun" object may be a movie genre and the "planet" objects that are already displayed may be movie titles in the genre. The additional selectable media guidance objects that are displayed may be "planet" objects containing advertisements that may or may not be related to the "sun" and "planet" objects that are already displayed.

In some embodiments, color-coded lines may be drawn between selectable media guidance objects to indicate the relationship between the objects. For example, the displayed "sun" object may represent a television show, a first set of displayed "planet" objects may represent episodes of the television show, and a second set of displayed "planet" objects may represent cast members of the television show. Red lines may connect the "sun" object with the episode "planet" objects, and blue lines may connect the "sun" object with the cast member "planet" objects. In addition, green lines may connect a cast member "planet" object with other "planet" objects representing episodes in which the cast member appears.

If it is determined at step 1004 that the movement does not indicate a command to display additional selectable media guidance objects, the process proceeds to step 1008. At step 1008, it is determined whether the movement indicates a selection of a selectable media guidance object. For example, the user may punch the air or jab at the screen to indicate a selection. If it is determined at step 1008 that the movement does indicate a selection of a selectable media guidance object, the process proceeds to step 1010.

At step 1010, the selectable media guidance object closest to the location of the visual indicator is selected. For example, visual indicator 914 may be centered over selectable media guidance object 904, and selectable media guidance object 904 will be selected (FIG. 9A). Alternately, the visual indicator may not touch any selectable media guidance object but may be much closer to one selectable media guidance object than to any other object, and the closest object will be selected. In some embodiments, the user may simply point at the desired selectable media guidance object to select it without moving the visual indicator or any of the displayed selectable media guidance objects.

If it is determined at step 1008 that the movement does not indicate a selection of a selectable media guidance object, the process proceeds to step 1012. At step 1012, the visual indicator is moved in the direction of the user movement. For example, if the user swings his arm to the left, the visual indicator may move toward the left side of the screen. If the user sweeps his arm downward, the visual indicator may move toward the bottom of the screen.

In some embodiments, selection of a selectable media guidance object may cause more information related to the selectable media guidance object to be displayed. For example, selection of a selectable media guidance object representing a television program may cause information to be displayed regarding what the program is about, which actors appear in the program, or when and on which channels the program will air. In other embodiments, if a particular selectable media guidance object represents a television program, selection of that particular object will cause the user television equipment to tune to or provide access to the represented program (e.g., download an on-demand media asset corresponding to the program from a server or stream the media asset from the Internet).

Figure 11:
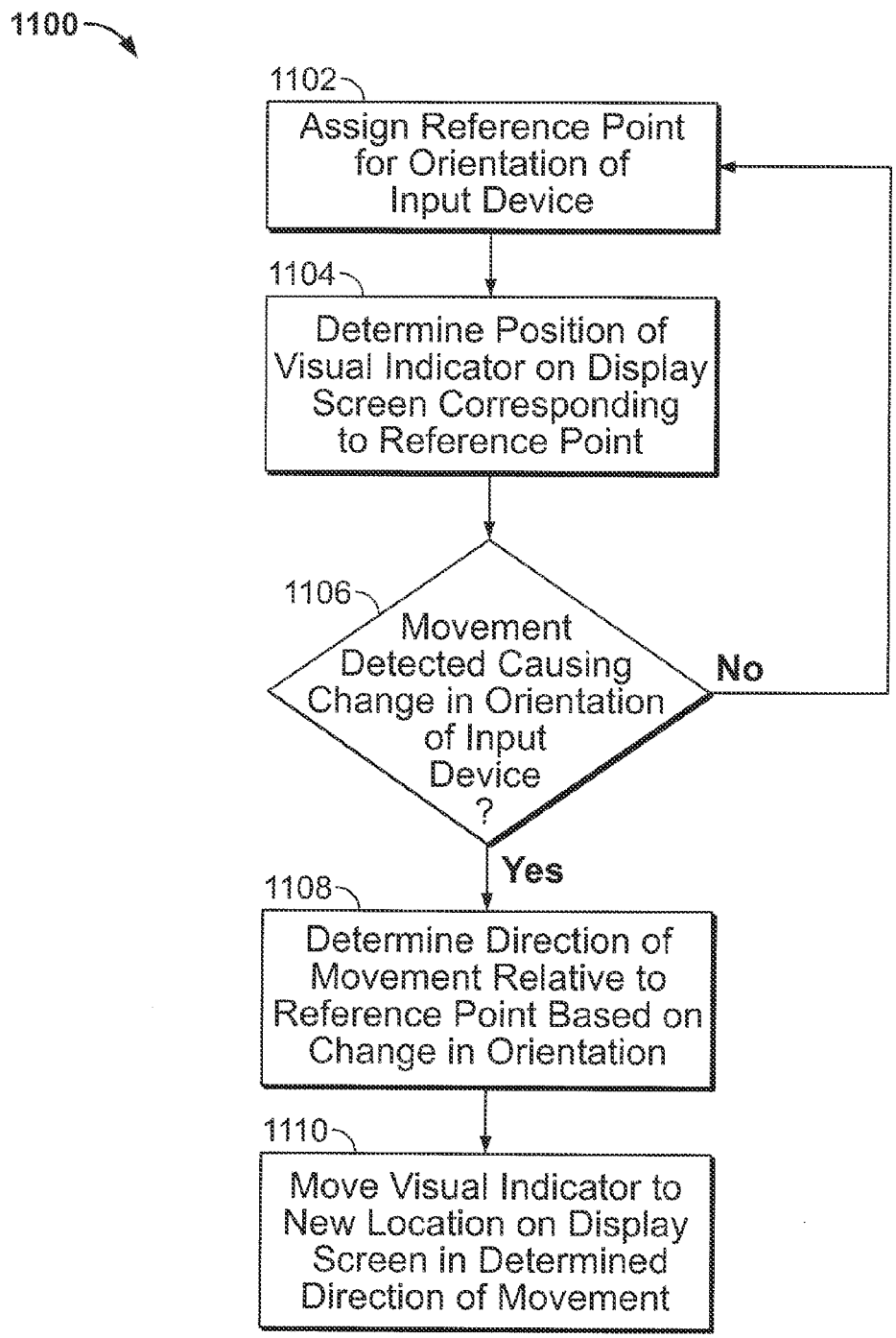

FIG. 11 is another illustrative flow diagram 1100 for navigating a 3D media guidance application in accordance with an embodiment of the invention. At step 1102, a reference point is assigned for the orientation of the input device. For example, if the input device is currently pointed upward, the reference point may be an the center of the top edge of the display screen. If the input device is currently pointed at the display screen, the reference point may be at the center of the display screen. If the input device is currently pointed downward, the reference point may be at the center of the bottom edge of the display screen. Any suitable point on the display screen may be assigned as the reference point for the current orientation of the input device.

At step 1104, the position of the visual indicator on the display screen corresponding to the reference point is determined. For example, if the reference point is at the center of the top edge of the display screen, the visual indicator may be positioned such that the top edge of the visual indicator is at the reference point. If the reference point is at the center of the display screen, the visual indicator may be centered at the reference point. If the reference point is at the center of the bottom edge of the display screen, the visual indicator may be positioned such that the bottom edge of the visual indicator is located slightly above the reference point. Any suitable relationship between the position of the visual indicator and the reference point may be determined.

At step 1106, it is determined whether or not the movement detected caused a change in orientation of the input device. When it is determined that the movement detected has not caused a change in orientation of the input device, the process begins again at step 1102. For example, the system may not respond to a purely lateral translation of the entire input device. If the input device rests on a table and is pointing toward the ceiling, and the input device is moved across the table but kept pointed toward the ceiling, at step 1106 it may be determined that the orientation of the input device has not changed.

When it is determined that the movement detected has caused a change in orientation of the input device, the process proceeds to step 1108. At step 1108, the direction of movement relative to the reference point is determined based on the change in orientation. For example, the input device may be tilted upward relative to the reference point. Alternately, the input device may be rotated laterally from one side of the reference point to the other side. The change in orientation of the input device may occur in any direction relative to the reference point.

At step 1110, the visual indicator is moved to a new location on the display screen in the determined direction of movement. For example, if the input device is tilted upward, the visual indicator may move toward the top edge of the display screen. If the input device was pointing to the left of the reference point but is now pointed to the right of the reference point, the visual indicator may move toward the right edge of the display screen.

It should be understood that the above steps of the flow diagrams of FIGS. 10-11 may be executed or performed in any order or sequence not limited to the order and sequence shown and described in the figures. Also, some of the above steps of the flow diagrams of FIGS. 10-11 may be executed or performed substantially simultaneously where appropriate or in parallel to reduce latency and processing times.

As mentioned before, a stereoscopic effect may be achieved by generating a first image to be viewed with a user's right eye and generating a second image to be viewed with the user's left eye, then superimposing the two images to produce a stereoscopic image. The design of the two images is discussed in detail below in relation to FIGS. 12A-C and 13.

Figure 12A:
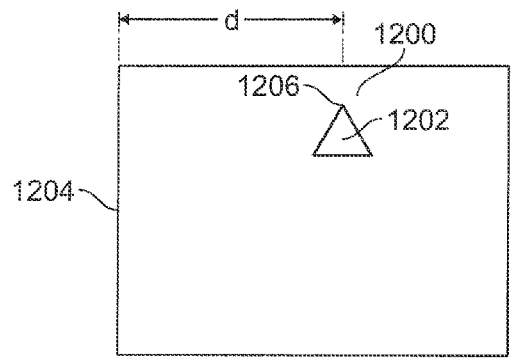
FIG. 12A shows an illustrative image to be viewed with a user's left eye in accordance with an embodiment of the invention.

FIG. 12A shows an illustrative image 1200 to be viewed with a user's right eye in accordance with an embodiment of the invention. Image 1200 includes a selectable media object 1206 centered at a point 1202. Point 1202 is located at a distance d from the left edge 1204 of image 1200.

Figure 12B:
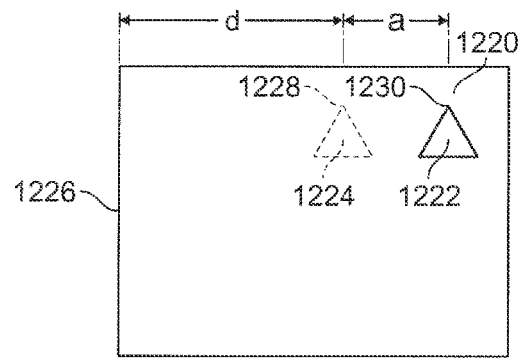
FIG. 12B shows an illustrative image to be viewed with a user's right eye in accordance with an embodiment of the invention.

FIG. 12B shows an illustrative image 1220 to be viewed with a user's left eye in accordance with an embodiment of the invention. Image 1220 includes a selectable media object 1230 centered at a point 1222. Selectable media object 1230 is a translation by a distance a of selectable media object 1206 in FIG. 12A, reproduced in FIG. 12B as dotted selectable media object 1228 centered at a point 1224. Point 1222 is located at a distance d+a from the left edge 1226 of image 1220.

Figure 12C:
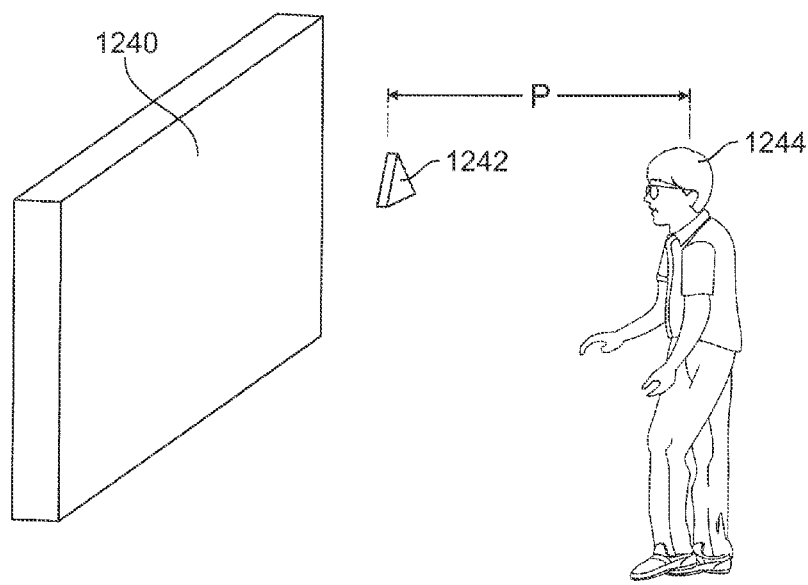
FIG. 12C shows an illustrative side view of the stereoscopic image formed by superimposing the images in FIGS. 12A-B, in accordance with an embodiment of the invention.

FIG. 12C shows an illustrative side view of the stereoscopic image 1240 formed by superimposing the images in FIGS. 12A-B, assuming the stereoscopic image 1240 is actually three-dimensional, in accordance with an embodiment of the invention. The superposition of selectable media object 1206 from FIG. 12A and selectable media object 1230 from FIG. 12B produces a selectable media object 1242. Selectable media object 1242 is perceived to be at an apparent distance P from a user 1244 who is looking at stereoscopic image 1240 through a stereoscopic device (discussed above). The relationship between distances a and P is explained in further detail below in relation to FIG. 13.

Figure 13:
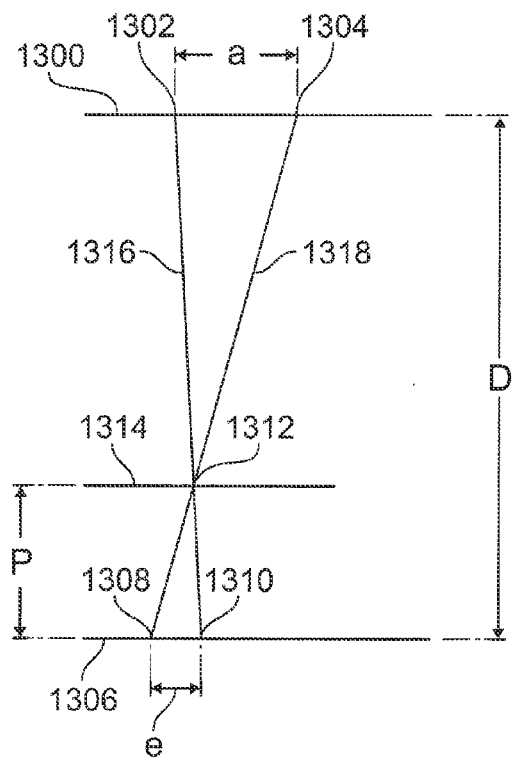
FIG. 13 is a diagram illustrating the use of similar triangles in producing a stereoscopic image in accordance with an embodiment of the invention.

FIG. 13 is a diagram illustrating the use of similar triangles in producing a stereoscopic image in accordance with an embodiment of the invention. The distance e indicated at the bottom of FIG. 13 between points 1308 and 1310 represents the "effective eye spacing", which is defined as the difference between the distance between the pupils or the eyes of the user and the user equipment device. The distance D is the distance from the user's eyes, which are represented by line 1300, to the display screen, which is represented by line 1300. The distance a is the distance between an image feature in the image for the right eye and the same image feature in the image for the left eye, represented by points 1302 and 1304, respectively. A large distance a will make an object appear to be very near to she user. 3D films and 3D games may apply a large distance a to features which jump out at the user like rocks, arrows, swords and other surprising items. The media object is the stereoscopic image, represented by a point 1312 along a plane 1314, is perceived to appear at a distance P from the user. A line 1316 may be drawn between point 1302 and point 1310, and another line 1318 may be drawn between point 1304 and point 1308 so that two similar triangles are formed. One triangle is formed with vertices at points 1308, 1310, and 1312. The second triangle is formed with vertices at points 1304, 1302, and 1312. The similar triangles yield the relationship $a/(D-P)=e/P.$ To obtain a clearer relationship between a and P, the above equation can be rewritten in the form $a=e*(D-P)/P$ or $P=e*D/(a+e).$ Using the above design equations, a translation distance a may be calculated for any desired apparent distance P, and the apparent distance P may be calculated for any translation distance a. The above analysis assumes that all values are positive. In some implementations, a coordinate system, with positive and negative values may be used so that distinctions can be made between translations to the right and left and between a media object appearing in front of or behind the screen.

Figure 14:
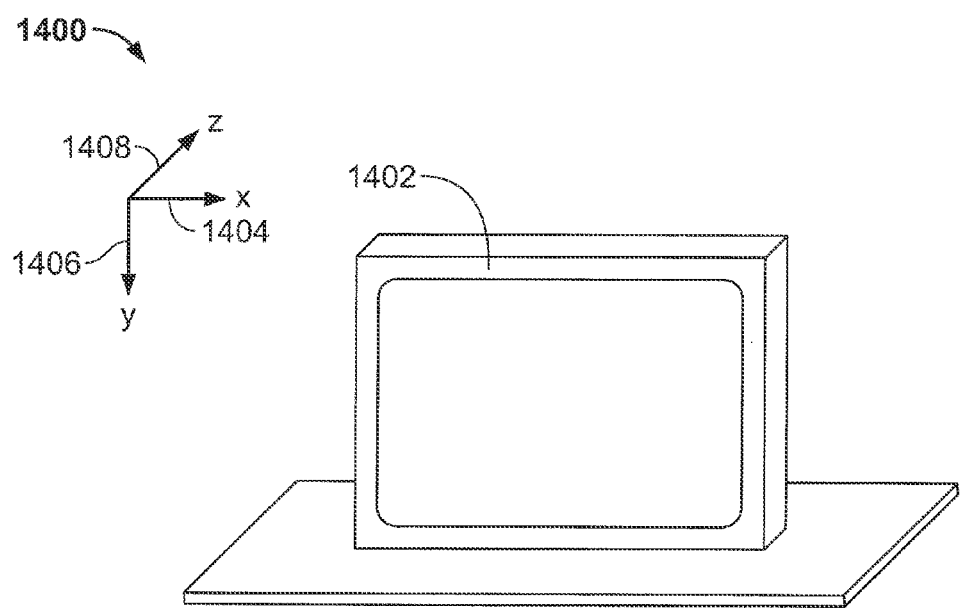
FIG. 14 shows a coordinate system used in producing a stereoscopic image in accordance with an embodiment of the invention.

FIG. 14 shows a coordinate system 1400 used in producing a stereoscopic image in accordance with an embodiment of the invention. For a display screen 1402, a translation to the right is positive and a translation to the left is negative since the positive x-axis 1404 points to the right. An image feature appearing behind display screen 1402 may have a positive z-value and an image feature appearing in front of display screen 1402 may have a negative z-value since the positive z-axis 1408 is in the direction behind display screen 1402. The positive y-axis 1406 points downward. This contrary direction may occur because graphics memory may be laid out with the top-left pixel at the lowest point in memory. That is, the origin of the coordinate system may be positioned at the top-left pixel or the screen. The upside-down y-axis therefore makes y-values consistently increase with memory addressing; as the y-value gets larger the memory address gets larger.

Using the coordinate system described above, point 1312 in FIG. 13 may be defined to be at a distance −z from line 1130. The similar triangles relationship can therefore be rewritten as $a/z=e/(D+z).$ The design equations can be rewritten as $a=(z*e)/(D+z)$ and $z=(D*a)/(e-a).$ These design equations may differ based on eye spacing and therefore e may vary between users. A higher z result may always be further away from the user as the translation moves to the right, and a lower z result may always be nearer the user as the translation moves to the left.

The length dimensions in the x- and y-directions in the coordinate system described above may be converted into pixel locations. Since the number of horizontal and vertical pixels in graphics buffers may vary from system to system, general equations like the following for scaling x- and y-coordinates to pixels may be used:

x in pixels=(partial x distance in inches from the left toward the right/total distance across the screen in inches)*(total number of pixels across the entire screen)

y in pixels=(partial y distance in inches from the top toward the bottom/total distance across the screen in inches)*(total number of pixels across the entire screen).

Once converted to pixels, the size in inches of any given object during playback on any given user equipment device may vary according to the size of the display screen of the user equipment device. In particular, the bigger the display screen, the bigger the measurable image of the object may be. By using the above equations, measurements may remain proportionally correct with each other no matters how they are converted, enlarged, or shrunk in size.

As described above in relation to FIGS. 7A-B, a stereoscopic media guidance application display may be modeled after a planetary system. Using some specific formulas from 3D graphics, the "sun" and "planet" objects of a stereoscopic media guidance application display may be placed anywhere, and at any angle, with respect to the x-, y-, and z-coordinates of the pixels forming the objects.

In some embodiments, the "planet" objects may be animated to move out from behind the "sun" object, and then around it. Using the coordinate system described above, the position of a media object in the image presented to each of the user's eyes may be calculated. In addition, the locations of the media object in the first and second images may be updated to cause the media object to be perceived to move in the stereoscopic image.

In some embodiments, calculations may be simplified by considering the center of the "sun" object to be at the origin (0,0,0) of a coordinate system. Since the upper-left corner of a display screen may be at the origin (0,0,0) of pixel space, calculations in pixel space may be translated to treat the center of the "sun" object as the origin point. Processing circuitry 306 may perform translation using the following translation formulas from 3D computer graphics:

new_x=old_x+Tx; where Tx=a constant;

new_y=old_y+Ty; where Ty=a constant;

new_z=old_z+Tz; where Tz=a constant.

In some embodiments, scaling formulas from 3D computer graphics may be used by processing circuitry 306 to translate coordinates between display screens of different sizes:

new_x=scaling_factor*old_x;

new_y=scaling_factor*old_y;

new_z=scaling_factor*old_z.

In some embodiments, a user equipment device, such as a set top box, may have enough processing power to compute all the points needed for 3D computer models at the rates needed for animation. In some implementations, the user equipment device may use four frame buffers where each frame buffer includes memory storage large enough to accommodate a full screen display of pixels. In some implementations, two of the four buffers may be used for the two images currently presented by the user equipment device on the display screen and the other two buffers may be used for preparing the next pair of images in the animation.

The above and below methods for generating stereoscopic images may be used to convert any 2D media guidance application for display in 3D space. Additionally, once a media guidance application is displayed in 3D space, 3D navigation techniques (e.g., using an input device with an accelerometer and/or gyroscope) may be used to effectuate selections and navigate about the media guidance application. One particular example of a media guidance application that may be converted from 2D into 3D may be a folding media guidance application that has a folding guide design in which menu options and items are arranged in different perspective views.

For example, a list of menu options may be displayed in a first perspective view and items corresponding to a selected one of the menu options may be displayed adjacent the menu options in a second perspective view that is different from the first perspective view. Folding guides or media guidance applications (media guidance application) with multiple perspective views are described in greater detail in U.S. patent application Ser. No. 12/571,069, filed Sep. 30, 2009, now U.S. Pat. No. 8,555,315, which is hereby incorporated by reference herein in its entirety.

Figure 16:
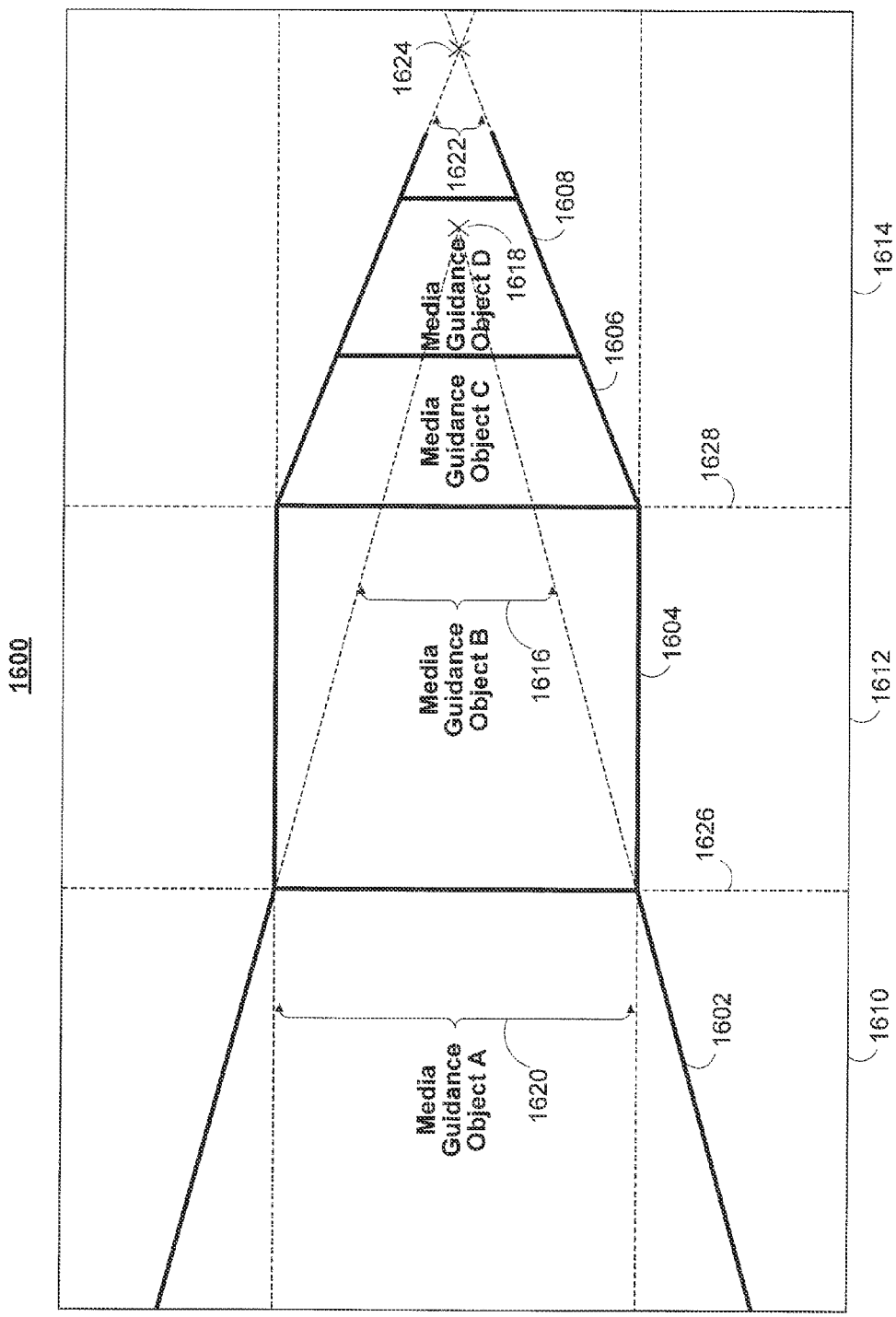
FIG. 16 shows an illustrative display screen of media guidance objects displayed in different perspectives in accordance with an embodiment of the invention.

FIG. 16 shows an illustrative display screen 1600 of media guidance objects displayed in different perspectives in accordance with an embodiment of the invention. In particular, screen 1600 may include a first media guidance object 1602, a second media guidance object 1604, a third media guidance object 1606, a fourth media guidance object 1608, a first perspective view 1610, a second perspective view 1612 and a third perspective view 1614. Although four media guidance objects are shown in screen 1600, any number of media guidance objects may be displayed in any of the different perspectives. Also, although three different perspective views are shown in screen 1600, any number of perspective views may be provided.

First media guidance object 1602 may be displayed in first perspective view 1610. First media guidance object 1602 may be for example a user profile representation, a media asset representation, a program guide listing, or any other media guidance object discussed above and below or combination of the same. First media guidance object 1602 may be displayed such that lines 1616 converge at a first vanishing point 1618. All lines that emerge from media guidance objects displayed in first perspective view 1610 may converge at first vanishing point 1618. First media guidance object 1602 appears to be costing out of screen 1600.

Second media guidance object 1604 may be displayed in second perspective view 1612. Second perspective view 1612 may be different from first perspective view 1610. Second media guidance object 1604 may be for example a user profile representation, a media asset representation, a program guide listing, or any otter media guidance object discussed above and below or combination of the same. Second media guidance object 1604 may be of the same type as first media guidance object 1602 or of a different type.

Second media guidance object 1604 may be displayed such that lines 1620 are parallel and may never converge at a vanishing point. All lines that emerge from media guidance objects displayed in second perspective view 1612 may be parallel and never converge at a vanishing point. Second media guidance object 1604 appears to be flat on screen 1600.

Third and fourth media guidance objects 1606 and 1608 may be displayed in third perspective view 1614. Third and fourth media guidance objects 1606 and 1608 may be for example user profile representations, media asset representations, program guide listings, or any other media guidance objects discussed above and below or combination of the same. Third and fourth media guidance objects 1606 and 1608 may be of the same type as first and/or second media guidance objects 1602 and 1604 or of a different type. In some implementations, third and fourth media guidance objects 1606 and 1608 may be of the same type (e.g., program listings) as second media guidance object 1604 and of a different type than first media guidance object 1602.

Third and fourth media guidance objects 1606 and 1608 may be displayed such that lines 1622 converge at a second vanishing point 1624 that is at a different location than first vanishing point 1618. All lines that emerge from media guidance objects displayed in third perspective view 1614 may converge at second vanishing point 1624. Third and fourth media guidance objects 1606 and 1608 appear to be going into screen 1600.

Although media guidance objects are displayed in different perspective views, it should be understood that the media guidance objects are clearly visually distinguishable by the user. However, some media guidance objects that are displayed very far into a particular perspective may become distorted and hard to visually distinguish. For example, media guidance objects may be images or videos such that most of the images or videos displayed in any perspective view are ascertainable and clearly viewable by the user. In particular, an image or video displayed in a perspective view that appears to go into or come out of the screen is substantially as clear as when the image or video is displayed in a perspective view that appears flat on the screen.

The media guidance objects that are displayed in first perspective view 1610 may be adjacent or next to media guidance objects displayed in second perspective view 1612. For example, first media guidance object 1602 may be displayed adjacent second media guidance object 1604 such that first media guidance object 1602 and second media guidance object 1604 connect at a first side 1626 of secured media guidance object 1604.

The media guidance objects that are displayed in third perspective view 1614 may be adjacent or next to the media guidance object displayed in second perspective view 1612. In some implementations, media guidance objects that are displayed in third perspective view 1614 may be adjacent to a side of the media guidance object displayed in second perspective view 1612 that is opposite a side of the media guidance object displayed in second perspective view 1612 than is adjacent to the media guidance objects that are displayed in first perspective view 1610. For example, third media guidance object 1606 may be displayed adjacent second media guidance object 1604 such that third media guidance object 1606 and second media guidance object 1604 connect at a second side 1628 of second media guidance object 1604 that is opposite first side 1626.

The point of adjacency between a media guidance object displayed in one perspective view and a media guidance object displayed in another perspective view is referred to herein a "fold" or a "folding point." It should be understood that the media guidance objects may not be immediately adjacent such that they are touching and in such circumstances the point of adjacency refers to the point at which one perspective view changes into another perspective view. For example, the media guidance objects in screen 1600 are displayed in different perspectives to create two folding points. There may be one, two or any other suitable number of folding points in various embodiments. The folding points create the appearance of a crease in the screen that occurs between two displayed media guidance objects.

In some embodiments, instead of displaying the various options and items of the folding guide in different perspective views limited by the 2D space, the folding guide may be converted into 3D space. More specifically, options in the folding guide that are displayed in a first perspective view may be generated for display in a first plane that intersects the normal of the screen at a first location and items corresponding to a selected one of the options may be generated for display in a second plane that intersects the normal of the screen at a second location that is different from the first location.

For example, first media guidance object 1602 displayed in first perspective view 1610 may appear in a first plane, such as the plane in which selectable media guidance object 704 appears in FIG. 7A. First media guidance object 1602 may have the same or similar functionality and behavior as media guidance object 704. Second media guidance object 1604 displayed in second perspective view 1612 may appear in a second plane, such as the plane in which selectable media guidance object 702 appears. Second media guidance object 1604 may have the same or similar functionality and behavior as media guidance object 702. The first plane may appear closer to the viewer than the second plane. In some embodiments, third media guidance object 1606 displayed in third perspective view 1614 may appear in a third plane, such as the plane in which selectable media guidance object 708 appears, and fourth media guidance object 1608 displayed in third perspective view 1614 may appear in a fourth plane, such as the plane in which selectable media guidance object 710 appears. In other embodiments, third media guidance object 1606 and fourth media guidance object 1608 may appear in the same plane, such as the third plane. In some implementations, third and fourth media guidance objects 1606 and 1608 may have the same or similar functionality and behavior as media guidance object 708.

In some embodiments, the first and second planes may appear to be in front of the screen, while the third and fourth planes may appear to be behind the screen. In other embodiments, the planes may all appear to be in front of the screen, but the third and fourth planes may appear to be farther away from the user than the first and second planes. Any other desirable configuration of the location in 3D space of the first, second, third and fourth planes may be selected without departing from the scope of the invention. In some embodiments, the different planes may meet at folding points as discussed above.

Figure 15:
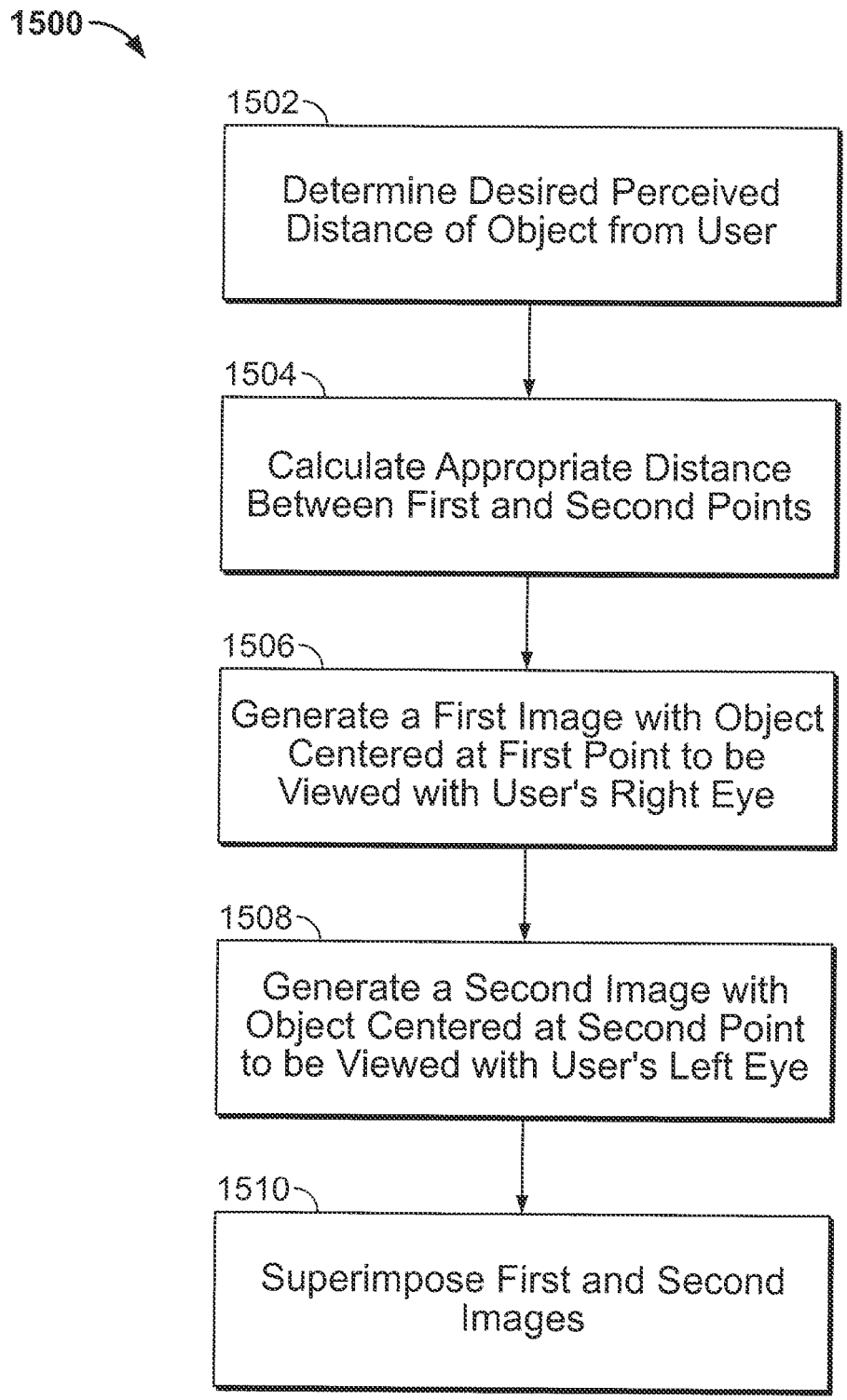
FIG. 15 is an illustrative flow diagram for designing graphics for a 3D media guide display in accordance with an embodiment of the invention.

FIG. 15 is an illustrative flow diagram 1500 for designing graphics for a 3D media guide display in accordance with an embodiment of the invention. At step 1502, the desired perceived distance of an object from a user is determined. For example, processing circuitry 306 may determine that selectable media guidance object 754 is to appear a few inches from the user's face. Alternately, processing circuitry 306 may determine that selectable media guidance object 762 is to appear far away from the user, behind the display screen.

At step 1504, the appropriate distance between a first point and a second point is calculated, The first point may to the center of a selectable media object 1206 in an image to be viewed with a user's right eye, as discussed above in relation to FIG. 12A. The second point may be the center of the same selectable media object 1222 in an image to be viewed with a user's left eye, as discussed above in relation to FIG. 12B. The appropriate distance between the first and second points may be related to the desired perceived distance of the object from the user. Processing circuitry 306 may calculate such an appropriate distance using any of the formulas discussed above in relation to FIG. 13.

At step 1506, a first image is generated with an object centered at the first point to be viewed with the user's right eye. For example, the object may be a selectable media guidance object 752 representing a television series that is the "sun" object in a planetary guide, as discussed above in relation to FIG. 7B. Alternately, the object, may be a selectable media guidance object 754, 756, 758, 760, or 762 representing a cast member that is a "planet" object. Processing circuitry 306 may generate a first image of selectable media guidance object 752 that is to be viewed with the user's right eye in accordance with the similar triangles algorithm discussed above.

At step 1508, a second image is generated with the object centered at the second point to be viewed with the user's left eye. For example, the object may be a selectable media guidance object 732 representing a television series that is the "sun" object in a planetary guide, as discussed above in relation to FIG. 7B. Alternately, the object may be a selectable media guidance object 754, 756, 758, 760, or 762 representing a cast member that is a "planet" object. Processing circuitry 306 may generate the second image by copying the first image of selectable media guidance object 752 and positioning that object at a different point to the left/rights of the position selectable media guidance object 752 in the first image.

At step 1510, the first and second images are superimposed. For example, processing circuitry 306 may combine the first and second images into a single image for simultaneous display on the screen. The superimposed image when viewed by the user with a stereoscopic optical device appears three-dimensional as the left eye of the user sees the first image and the right eye of the user sees the second image. The user's brain combines the two images seen by the respective eyes of the user and interprets the image as being positioned in front of or behind the display depending on the distance between the two positions of selectable media guidance object 752.

It should be understood that the above steps of the flow diagram of FIG. 15 may be executed or performed in any order or sequence not limited to the order and sequence shown and described in the figure. Also, some of the above steps of the flow diagram of FIG. 15 may be executed or performed substantially simultaneously where appropriate or in parallel to reduce latency and processing times.

The above described embodiments of the present invention are presented for purposes of illustration and not of limitation, and the present invention is limited only by the claims which follow.

What is claimed is:

1. A method for designing graphics for selectable stereoscopic media objects displayed on a screen having a first point, the method comprising:
   generating a display of a first image that includes a first selectable media object centered at the first point to be viewed with a user's right eye;
   generating a display of a second image that includes a copy of the first selectable media object centered at a second point of the screen different from the first point to be viewed with the user's left eye;
   generating a display of a superimposed image of the first and second images to produce a first stereoscopic image, wherein the first selectable media object appears in the first stereoscopic image at a first perceived distance from the user when the user views the stereoscopic image through a stereoscopic optical device from a given position; and
   responsive to receiving a user selection of the first selectable media object from the first stereographic image:
      modifying the distance between the first and second points, wherein the distance between the first and second points on the screen corresponds to the first perceived distance; and
      generating a display of a second stereoscopic image based on the modified distance between the first and second points, wherein the first selectable media object appears in the second stereoscopic image at a second perceived distance from the user when the user views the stereoscopic image through the stereoscopic optical device from the given position.

2. The method of claim 1, further comprising using similar triangles to determine a relationship between an offset distance and an apparent distance, wherein:
   the offset distance is the distance between the first and second points;
   the apparent distance is the distance the first selectable media object appears to be from the screen; and
   the apparent distance is positive if the first selectable media object appears to be behind the screen and negative if the first selectable media object appears to be in front of the screen.

3. The method of claim 2, wherein the offset distance and the apparent distance are computed in accordance with:

$$a=(z*e)/(D+z), \text{ and}$$

$$z=(D*a)/(e-a),$$

wherein: a is the offset distance, z is the apparent distance, e is a difference between a distance between pupils of the eyes of the user and a width of the media object, and D is a distance between the eyes of the user and the screen.

4. The method of claim 1, further comprising using a coordinate system to calculate the position of the first selectable media object in the first and second images.

5. The method of claim 1, further comprising updating the locations in the first and second images at which the first selectable media object is positioned to cause the first selectable media object to be perceived to move in the stereoscopic image.

6. The method of claim 1, wherein the stereoscopic optical device comprises:
   a first opening for viewing the first image with the user's right eye, wherein the first image is the only image seen by the user's right eye; and
   a second opening for viewing the second image with the user's left eye, wherein the second image is the only image seen by the user's left eye.

7. The method of claim 6, wherein the stereoscopic optical device further comprises:
   a first lens covering the first opening, wherein the user views the first image through the first lens; and
   a second lens covering the second opening, wherein the user views the second image through the second lens.

8. The method of claim 1, wherein:
   the first image includes a second selectable media object centered at a third point;
   the second image includes a copy of the second selectable media object centered at a fourth point of the screen different from the third point;
   the second selectable media object appears in the stereoscopic image at a second perceived distance;
   the first selectable media guidance object appears in the stereoscopic image in a first perspective view; and
   the second selectable media guidance object appears in the stereoscopic image in a second perspective view different from the first perspective view.

9. The method of claim 8, wherein:
   the combination of the media guidance objects appearing in the first and second perspective views appear as a continuous array of media guidance objects; and
   the array appears to have a first fold at a first point of adjacency, wherein the first point corresponds to a first location between the first media guidance object that appears in the first perspective view and the second media guidance object that appears in the second perspective view.

10. The method of claim 1, wherein the selectable stereoscopic media objects are media objects displayed within an environment selected from the group consisting of a game, a software application, and a media guide.

11. A system for designing graphics for selectable stereoscopic media objects, the system comprising:
   processing circuitry configured to:
      generate a display of a first image that includes a first selectable media object centered at the first point to be viewed with a user's right eye;
      generate a display of a second image that includes a copy of the first selectable media object centered at a second point of a display screen different from the first point to be viewed with the user's left eye;
      generate a display of a superimposed image of the first and second images to produce a first stereoscopic image, wherein the first selectable media object appears in the first stereoscopic image at a first perceived distance from the user when the user views the stereoscopic image through a stereoscopic optical device from a given position; and responsive to receiving a user selection of the first selectable media object from the first stereoscopic:
modify the distance between the first and second points, wherein the distance between the first and second points on the display screen corresponds to the first perceived distance; and
generate a display of a second stereoscopic image based on the modified distance between the first and second points, wherein the first selectable media object appears in the second stereoscopic image at a second perceived distance from the user when the user views the stereoscopic image through the stereoscopic optical device from the given position.

12. The system of claim 11, wherein the processing circuitry is further configured to use similar triangles to determine a relationship between an offset distance and an apparent distance, wherein:
the offset distance is the distance between the first and second points;
the apparent distance is the distance the first selectable media object appears to be from the display screen; and
the apparent distance is positive if the first selectable media object appears to be behind the display screen and negative if the first selectable media object appears to be in front of the display screen.

13. The system of claim 12, wherein the processing circuitry is further configured to compute the offset distance and the apparent distance in accordance with:

$$a=(z*e)/(D+z),\text{ and}$$

$$z=(D*a)/(e-a),$$

wherein: a is the offset distance, z is the apparent distance, e is a difference between a distance between pupils of the eyes of the user and a width of the media object, and D is a distance between the eyes of the user and the display screen.

14. The system of claim 11, wherein the processing circuitry is further configured to use a coordinate system to calculate the position of the first selectable media object in the first and second images.

15. The system of claim 11, wherein the processing circuitry is further configured to update the locations in the first and second images at which the first selectable media object is positioned to cause the first selectable media object to be perceived to move in the stereoscopic image.

16. The system of claim 11, wherein the stereoscopic optical device comprises:
a first opening for viewing the first image with the user's right eye, wherein the first image is the only image seen by the user's right eye; and
a second opening for viewing the second image with the user's left eye, wherein the second image is the only image seen by the user's left eye.

17. The system of claim 16, wherein the stereoscopic optical device further comprises:
a first lens covering the first opening, wherein the user views the first image through the first lens; and
a second lens covering the second opening, wherein the user views the second image through the second lens.

18. The system of claim 11, wherein:
the first image includes a second selectable media object centered at a third point;
the second image includes a copy of the second selectable media object centered at a fourth point of the display screen different from the third point;
the second selectable media object appears in the stereoscopic image at a second perceived distance;
the first selectable media guidance object appears in the stereoscopic image in a first perspective view; and
the second selectable media guidance object appears in the stereoscopic image in a second perspective view different from the first perspective view.

19. The system of claim 18, wherein:
the combination of the media guidance objects appearing in the first and second perspective views appear as a continuous array of media guidance objects; and
the array appears to have a first fold at a first point of adjacency, wherein the first point corresponds to a first location between the first media guidance object that appears in the first perspective view and the second media guidance object that appears in the second perspective view.

20. The system of claim 11, wherein the selectable stereoscopic media objects are media objects displayed within an environment selected from the group consisting of a game, a software application, and a media guide.

* * * * *